United States Patent
Funaya et al.

(10) Patent No.: US 12,404,353 B2
(45) Date of Patent: Sep. 2, 2025

(54) OLEFIN POLYMERIZATION CATALYST, OLEFIN POLYMERIZATION CATALYST PRODUCTION METHOD, AND OLEFIN POLYMER PRODUCTION METHOD USING THE OLEFIN POLYMERIZATION CATALYST

(71) Applicant: JAPAN POLYPROPYLENE CORPORATION, Tokyo (JP)

(72) Inventors: Munehito Funaya, Mie (JP); Ryota Fujita, Mie (JP)

(73) Assignee: JAPAN POLYPROPYLENE CORPORATION, Tokyo (JP)

(*) Notice: Subject to any disclaimer, the term of this patent is extended or adjusted under 35 U.S.C. 154(b) by 566 days.

(21) Appl. No.: 17/912,283

(22) PCT Filed: Mar. 23, 2021

(86) PCT No.: PCT/JP2021/012028
§ 371 (c)(1),
(2) Date: Sep. 16, 2022

(87) PCT Pub. No.: WO2021/193650
PCT Pub. Date: Sep. 30, 2021

(65) Prior Publication Data
US 2023/0142911 A1    May 11, 2023

(30) Foreign Application Priority Data
Mar. 25, 2020    (JP) .................. 2020-055045

(51) Int. Cl.
C08F 4/616    (2006.01)
C08F 4/659    (2006.01)
(Continued)

(52) U.S. Cl.
CPC ........ *C08F 4/65927* (2013.01); *C08F 4/6162* (2013.01); *C08F 4/65912* (2013.01);
(Continued)

(58) Field of Classification Search
None
See application file for complete search history.

(56) References Cited

U.S. PATENT DOCUMENTS

2017/0029539 A1    2/2017  Nishida et al.

FOREIGN PATENT DOCUMENTS

| JP | 10-36448 A | 2/1998 |
|---|---|---|
| JP | 2000-504045 A | 4/2000 |

(Continued)

OTHER PUBLICATIONS

Weiss, K. et al., "Polymerisation of ethylene or propylene with heterogeneous metallocene catalysts on clay minerals". Journal of Molecular Catalysis A: Chemical 2002, 182-183, 143-149. (Year: 2002).*

(Continued)

*Primary Examiner* — Richard A. Huhn
(74) *Attorney, Agent, or Firm* — GREENBLUM & BERNSTEIN, P.L.C.

(57) ABSTRACT

To provide an olefin polymerization catalyst having high catalytic activity (polymerization activity), an olefin polymerization catalyst production method, and an olefin polymer production method using the olefin polymerization catalyst. An olefin polymerization catalyst comprising the following components [A], [B] and [C]:
the component [A]: a metallocene complex having a specific indenyl structure,
the component [B]: a solid component containing one or more selected from the group consisting of (b-1) a fine particulate carrier on which an ionic compound or
(Continued)

Lewis acid which can convert the component [A] into a cation by reaction with the component [A], is supported, (b-2) solid acid fine particles, and (b-3) an ion-exchange layered compound,
and
the component [C]: a specific silylacetylene compound.

11 Claims, 1 Drawing Sheet

(51) Int. Cl.
  *C08F 4/6592* (2006.01)
  *C08F 10/06* (2006.01)
  *C08F 210/02* (2006.01)
(52) U.S. Cl.
  CPC .......... *C08F 4/65916* (2013.01); *C08F 10/06* (2013.01); *C08F 210/02* (2013.01)

(56) References Cited

FOREIGN PATENT DOCUMENTS

| | | | |
|---|---|---|---|
| JP | 2009-126902 | A | 6/2009 |
| JP | 2010-59375 | A | 3/2010 |
| JP | 2015-203056 | A | 11/2015 |
| JP | 2017-137464 | A | 8/2017 |
| WO | 1997/27224 | A1 | 7/1997 |

OTHER PUBLICATIONS

List, A. K. et al., "Preparation of trimethylsilyl alkyne complexes of bis(pentamethylcyclopentadienyl)zirconium, (η5-C5Me5)2Zr(RC≡CSiMe3), and their regioselective reactions with nitrous oxide". Inorganica Chimica Acta 1998, 270(1-2), 399-404. (Year: 1998).*

The Extended European Search Report issued in European Patent Application No. 21775402.7 dated Aug. 3, 2023.

Weiss et al., "Polymerisation of ethylene or propylene with heterogeneous metallocene catalysts on clay minerals", Journal of Molecular Catalysis A: Chemical, No. 182-183, 2002, pp. 143-149 (cited in Extended European Search Report).

Office Action issued in corresponding Chinese Patent Application No. 202180022644.9 dated Sep. 13, 2023, along with English translation thereof.

Office Action that issued in Japanese Patent Application No. 2021-048860, dated Jun. 25, 2024, along with English translation.

Poorkar, H. et al., "Optimize feed treatment for polypropylene process", Catalyst, 2013, pp. 77-79.

International Search Report and Written Opinion of the International Searching Authority issued in International Patent Application No. PCT/JP2021/012028, dated Jun. 8, 2021, along with an English translation thereof.

International Preliminary Report on Patentability issued in International Patent Application No. PCT/JP2021/012028, dated Sep. 22, 2022, along with an English translation thereof.

\* cited by examiner

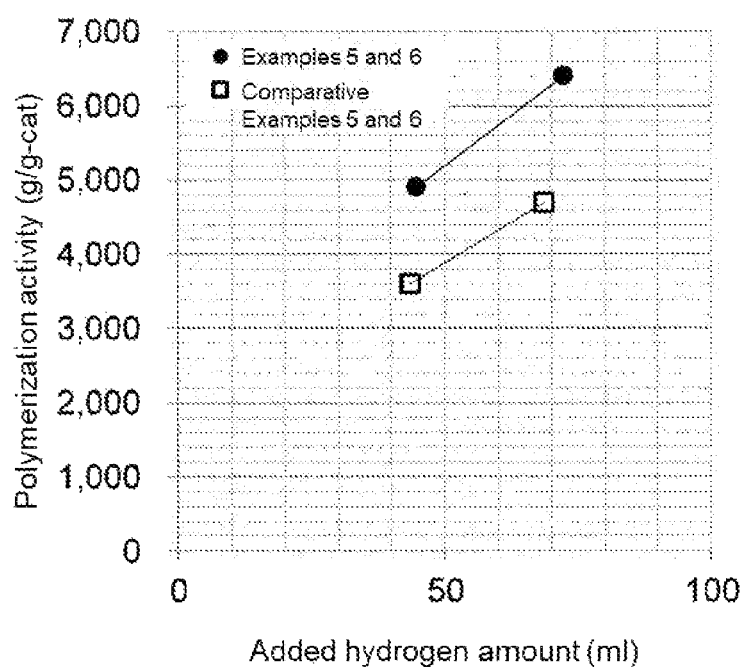

OLEFIN POLYMERIZATION CATALYST, OLEFIN POLYMERIZATION CATALYST PRODUCTION METHOD, AND OLEFIN POLYMER PRODUCTION METHOD USING THE OLEFIN POLYMERIZATION CATALYST

TECHNICAL FIELD

The present invention relates to an olefin polymerization catalyst which is useful for producing olefin polymers and olefin copolymers, an olefin polymerization catalyst production method, and an olefin polymer and copolymer production method using the olefin polymerization catalyst.

BACKGROUND ART

As polymerization catalysts which are used to produce olefin polymers such as a polyethylene polymer and a polypropylene polymer by olefin polymerization, Ziegler catalysts are mainly employed. In recent years, however, metallocene catalysts are regarded as important catalysts since polymers having high tacticity, a narrow molecular weight distribution and a narrow copolymer composition distribution are obtained with high activity. In addition, there are many kinds of researches and improvements made on metallocene catalysts, aiming at enhancing properties such as tacticity, catalytic activity (polymerization activity), molecular weight distribution and composition distribution, increasing copolymer types, and enhancing various molecular properties, for example.

For an olefin polymerization catalyst called a metallocene or post-metallocene catalyst, which is mainly composed of an organic transition metal compound, high activation of the catalyst is one important issue, and there are many reports on techniques for improving the catalytic activity. Among them, a method for producing the catalyst by adding an unsaturated hydrocarbon compound having a specific structure during the preparation of the catalyst, is industrially superior since the amount of additives is extremely small compared to the weight of a polymer thus obtained, and there is a small influence on products. For example, there are reports that the catalytic activity is increased by adding an alkene such as vinylcyclohexane, trimethylvinylsilane and 2-methyl-1-pentene or by adding an alkyne such as bis(trimethylsilyl)acetylene (Patent Documents 1, 2 and 3).

Meanwhile, since the catalytic activity is sometimes decreased by an unsaturated compound such as an alkene and an alkyne, there are reports on techniques for removing the unsaturated compound from the polymerization system (e.g., Patent Documents 4 and 5 and Non-Patent Document 1) and on catalyst systems which are characterized in that the activity is not decreased even in coexistence with them (e.g., Patent Document 6).

In view of the above circumstances, various kinds of effects are produced by adding a slight amount of unsaturated compound which is other than a monomer serving as a raw material for a polymer. From an industrial point of view, it cannot be said that sufficient catalytic activity is provided by the prior-arts in which a slight amount of unsaturated compound which is other than a monomer serving as a raw material for a polymer, is added for the purpose of increasing the catalytic activity. Accordingly, there is a demand for higher activation of the catalyst.

CITATION LIST

Patent Documents

Patent Document 1: Japanese translation of PCT International Application No. 2000-504045
Patent Document 2: Japanese Patent Application Laid-Open (JP-A) No. 2010-59375
Patent Document 3: JP-A No. 2009-126902
Patent Document 4: JP-A No. 2017-137464
Patent Document 5: JP-A No. H10-36448
Patent Document 6: JP-A No. 2015-203056
Non-Patent Document 1: "Optimize feed treatment for polypropylene process", Hydrocarbon processing, March, 2013, C-77 to C-79

SUMMARY OF INVENTION

Technical Problem

Considering the above-mentioned problems with the prior arts, an object of the present invention is to provide an olefin polymerization catalyst which is a metallocene catalyst having high catalytic activity (polymerization activity) and with which an olefin polymer is obtained with higher production efficiency, an olefin polymerization catalyst production method, and an olefin polymer production method using the olefin polymerization catalyst.

Solution to Problem

As a result of elaborate discussion on the circumstances, the inventors of the present invention found the following facts and achieved the present invention: when a metallocene catalyst supporting a specific metallocene complex is used in the presence of a specific silylacetylene compound, a decrease in performance is not caused even if a contact time between components is lengthened, and an olefin polymer is obtained with higher catalytic activity (polymerization activity).

The olefin polymerization catalyst of the present invention is an olefin polymerization catalyst comprising the following components [A], [B] and [C]:

the component [A]: a metallocene complex represented by the following general formula (1), the component [B]: a solid component containing one or more selected from the group consisting of the following (b-1) to (b-3):

(b-1) a fine particulate carrier on which an ionic compound or Lewis acid which can convert the component [A] into a cation by reaction with the component [A], is supported, (b-2) solid acid fine particles, and (b-3) an ion-exchange layered compound, and the component [C]: an alkyne compound represented by the following general formula (2):

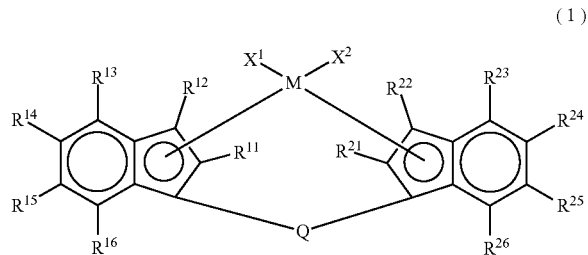

(1)

where M is Ti, Zr or Hf;
each of $X^1$ and $X^2$ is independently a halogen atom, an alkyl group containing 1 to 6 carbon atoms, an alkoxy group containing 1 to 6 carbon atoms, an alkyl group containing 1 to 6 carbon atoms and being substituted with a halogen atom, a substituted amino group substituted with an alkyl group containing 1 to 6 carbon atoms, or an aryl group containing 6 to 18 carbon atoms and optionally being substituted;
Q is an alkylene group containing 1 to 20 carbon atoms and optionally being substituted with an aryl group containing 6 to 18 carbon atoms, a silylene group optionally being substituted with a hydrocarbon group containing 1 to 20 carbon atoms, or a substituted germylene, phosphorus, amino, boron or alumylene group being substituted with a hydrocarbon group containing 1 to 20 carbon atoms; and
each of $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ is independently a hydrogen atom, a halogen atom, an alkyl group containing 1 to 6 carbon atoms, an alkoxy group containing 1 to 6 carbon atoms, an alkyl group containing 1 to 6 carbon atoms and being substituted with a halogen atom, an alkyl group containing 1 to 6 carbon atoms and being substituted with a trialkylsilyl group, a substituted silyl group being substituted with a hydrocarbon group containing 1 to 6 carbon atoms, an aryl group containing 6 to 18 carbon atoms and optionally being substituted, a furyl group optionally being substituted, or a thienyl group optionally being substituted, and $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ optionally form a 5- to 7-membered ring with adjacent substituents, the ring optionally including an unsaturated bond,

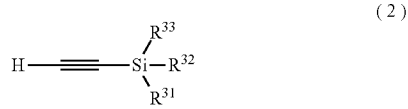

(2)

where each of $R^{31}$, $R^{32}$ and $R^{33}$ is independently a hydrogen atom, a hydrocarbon group containing 1 to 30 carbon atoms, a substituted silyl group being substituted with a hydrocarbon group containing 1 to 20 carbon atoms, a substituted germyl group being substituted with a hydrocarbon group containing 1 to 20 carbon atoms, a hydrocarbon group containing 1 to 30 carbon atoms and being substituted with the substituted silyl group, or a hydrocarbon group containing 1 to 30 carbon atoms and being substituted with the substituted germyl group.

In the olefin polymerization catalyst of the present invention, from the viewpoint of high catalyst activation, an amount of the contained component [C] is preferably from 0.001 mmol to 100 mmol per gram (g) of the component [B].

In the olefin polymerization catalyst of the present invention, from the viewpoint of high catalyst activation, the component [B] is preferably an ion-exchange layered silicate.

From the viewpoint of high catalyst activation, it is preferable that the olefin polymerization catalyst of the present invention further comprises the following component [D]:
the component [D]: an organoaluminum compound.

The olefin polymerization catalyst production method of the present invention is an olefin polymerization catalyst production method, wherein an olefin polymerization catalyst is produced by mixing the above-described components [A], [B] and [C].

In the olefin polymerization catalyst production method of the present invention, from the viewpoint of high catalyst activation, it is preferable that the components [B] and [C] are mixed, and then the component [A] is mixed with the mixture.

In the olefin polymerization catalyst production method of the present invention, from the viewpoint of high catalyst activation, an amount of the component [C] used is preferably from 0.001 mmol to 100 mmol per gram (g) of the component [B].

In the olefin polymerization catalyst production method of the present invention, from the viewpoint of high catalyst activation, the component [B] is preferably an ion-exchange layered silicate.

In the olefin polymerization catalyst production method of the present invention, from the viewpoint of high catalyst activation, it is preferable that the above-described component [D] is further added.

The olefin polymer production method of the present invention is an olefin polymer production method, wherein an olefin is polymerized or copolymerized in the presence of the olefin polymerization catalyst of the present invention or in the presence of an olefin polymerization catalyst obtained by the olefin polymerization catalyst production method of the present invention.

In the olefin polymer production method of the present invention, a propylene is optionally polymerized or a propylene is optionally copolymerized with an α-olefin in the presence of the olefin polymerization catalyst of the present invention or in the presence of an olefin polymerization catalyst obtained by the olefin polymerization catalyst production method of the present invention.

Advantageous Effects of Invention

According to the present invention, an olefin polymerization catalyst which is a metallocene catalyst having high catalytic activity (polymerization activity) and with which an olefin polymer is obtained with higher production efficiency, an olefin polymerization catalyst production method, and an olefin polymer production method using the olefin polymerization catalyst, are provided.

BRIEF DESCRIPTION OF DRAWING

FIG. 1 is a graph plotting, for Examples 5 and 6 and Comparative Examples 5 and 6, the polymerization activity of a catalyst with respect to the amount of added hydrogen.

DESCRIPTION OF EMBODIMENTS

I. Olefin Polymerization Catalyst

The olefin polymerization catalyst of the present invention is an olefin polymerization catalyst comprising the following components [A], [B] and [C]:

the component [A]: a metallocene complex represented by the following general formula (1), the component [B]: a solid component containing one or more selected from the group consisting of the following (b-1) to (b-3):

(b-1) a fine particulate carrier on which an ionic compound or Lewis acid which can convert the component [A] into a cation by reaction with the component [A], is supported, (b-2) solid acid fine particles, and (b-3) an ion-exchange layered compound, and the component [C]: an alkyne compound represented by the following general formula (2):

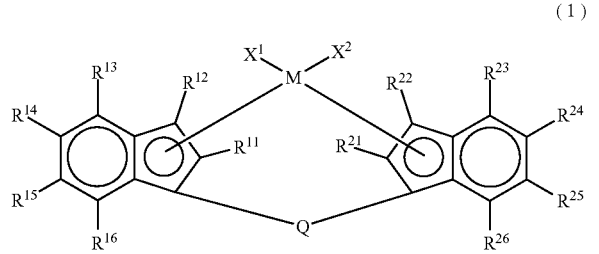

(1)

where M is Ti, Zr or Hf;

each of $X^1$ and $X^2$ is independently a halogen atom, an alkyl group containing 1 to 6 carbon atoms, an alkoxy group containing 1 to 6 carbon atoms, an alkyl group containing 1 to 6 carbon atoms and being substituted with a halogen atom, a substituted amino group substituted with an alkyl group containing 1 to 6 carbon atoms, or an aryl group containing 6 to 18 carbon atoms and optionally being substituted;

Q is an alkylene group containing 1 to 20 carbon atoms and optionally being substituted with an aryl group containing 6 to 18 carbon atoms, a silylene group optionally being substituted with a hydrocarbon group containing 1 to 20 carbon atoms, or a substituted germylene, phosphorus, amino, boron or alumylene group being substituted with a hydrocarbon group containing 1 to 20 carbon atoms; and each of $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ is independently a hydrogen atom, a halogen atom, an alkyl group containing 1 to 6 carbon atoms, an alkoxy group containing 1 to 6 carbon atoms, an alkyl group containing 1 to 6 carbon atoms and being substituted with a halogen atom, an alkyl group containing 1 to 6 carbon atoms and being substituted with a trialkylsilyl group, a substituted silyl group being substituted with a hydrocarbon group containing 1 to 6 carbon atoms, an aryl group containing 6 to 18 carbon atoms and optionally being substituted, a furyl group optionally being substituted, or a thienyl group optionally being substituted, and $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ optionally form a 5- to 7-membered ring with adjacent substituents, the ring optionally including an unsaturated bond,

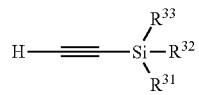

(2)

where each of $R^{31}$, $R^{32}$ and $R^{33}$ is independently a hydrogen atom, a hydrocarbon group containing 1 to 30 carbon atoms, a substituted silyl group being substituted with a hydrocarbon group containing 1 to 20 carbon atoms, a substituted germyl group being substituted with a hydrocarbon group containing 1 to 20 carbon atoms, a hydrocarbon group containing 1 to 30 carbon atoms and being substituted with the substituted silyl group, or a hydrocarbon group containing 1 to 30 carbon atoms and being substituted with the substituted germyl group.

The prior arts disclosed in Patent Documents 1 and 2 disclose techniques for increasing activity by adding trimethylvinylsilane or bistrimethylsilylacetylene to a metallocene complex having an azulene skeleton. However, when trimethylvinylsilane or bistrimethylsilylacetylene is applied to the metallocene complex specified in the present invention, as will be shown in comparative examples described later, a deterioration in catalytic activity occurs.

Meanwhile, lower alkynes such as unsubstituted acetylene and methyl acetylene are often contained in polymerizable monomers as impurities. It is known that they cause a reduction in catalytic activity.

Surprisingly, the inventors of the present invention found that an olefin polymer can be produced with high catalytic activity (polymerization activity) by adding the specific silylacetylene compound, that is, the alkyne compound represented by the general formula (2) to the specific metallocene catalyst.

The silylacetylene compound specified in the present disclosure has a structure such that a silyl group is bound by substitution to one of the carbon atoms of a carbon-carbon triple bond contained in the molecule, and a hydrogen atom is bound to the other carbon atom. Although the mechanism that catalytic activity is increased by the silylacetylene compound specified in the present invention, is not clear, it is thought as follows. The specific silylacetylene compound or a compound formed by a reaction between the silylacetylene compound and components contained in the catalyst system, is coordinated to a cationic catalytic active species formed by the specific metallocene complex, a co-catalyst and so on, or the compound further reacts with the cationic catalytic active species and the like after the coordination, thereby stabilizing the catalytic active species without disturbing a reaction with monomers. As a result, the catalytic activity can be increased.

Unsubstituted acetylene and methyl acetylene are known as catalyst poisons. As will be shown in the comparative examples described later, bistrimethylsilylacetylene also deteriorates catalytic activity. In view of this fact, it is thought that since the silylacetylene compound specified in the present invention has a hydrogen atom at one terminal of acetylene and a relatively bulky silyl group at the other terminal, the reactivity of the compound with the catalytic active species derived from the metallocene complex is appropriately adjusted.

The olefin polymerization catalyst of the present invention is less susceptible to the influence of reaction conditions at the time of catalyst preparation (e.g., reaction time); it has increased catalyst stability; and it can exhibit excellent polymerization activity. This is very preferable for catalyst production on industrial scale in industrial facilities.

In the present invention, "polymerization" collectively means homopolymerization of one kind of monomers and copolymerization of plural kinds of monomers, and both cases are simply described as "polymerization" especially when both cases need not to be distinguished.

Also in the present Description, "to" which shows a numerical range is used to describe a range in which the numerical values described before and after "to" indicate the lower limit value and the upper limit value.

Also in the Description, for example, the term "alkylene group containing 1 to 20 carbon atoms and optionally being substituted with an aryl group containing 6 to 18 carbon atoms" means that the carbon atoms of the aryl group, which is a substituent, are not included in the 1 to 20 carbon atoms of the alkylene group, and the term "hydrocarbon group containing 3 to 30 carbon atoms and being substituted with the substituted silyl group" means that the carbon atoms of the substituted silyl group are not included in the 3 to 30 carbon atoms of the hydrocarbon group. As just described, the carbon atoms of the substituent are not included in the carbon atoms specified for each group.

1. Component [A]

The component [A] used in the present invention is the metallocene complex represented by the general formula (1).

In the formula (1), M is Ti, Zr or Hf. From the viewpoint of high catalyst activation, M is preferably Zr or Hf.

In the formula (1), each of $X^1$ and $X^2$ is independently a halogen atom, an alkyl group containing 1 to 6 carbon atoms, an alkoxy group containing 1 to 6 carbon atoms, an alkyl group containing 1 to 6 carbon atoms and being substituted with a halogen atom, a substituted amino group substituted with an alkyl group containing 1 to 6 carbon atoms, or an aryl group containing 6 to 18 carbon atoms and optionally being substituted.

In the formula (1), as the halogen atom, examples include, but are not limited to, a chlorine atom, a bromine atom, an iodine atom and a fluorine atom.

In the formula (1), as the alkyl group containing 1 to 6 carbon atoms, examples include, but are not limited to, a methyl group, an ethyl group, an n-propyl group, an i-propyl group, an n-butyl group, an i-butyl group, an s-butyl group, a t-butyl group, an n-pentyl group, an n-hexyl group, a cyclopropyl group, a cyclopentyl group and a cyclohexyl group.

As the alkoxy group containing 1 to 6 carbon atoms, examples include, but are not limited to, a methoxy group, an ethoxy group, an n-propoxy group, an i-propoxy group, an n-butoxy group, an i-butoxy group, a t-butoxy group and a phenoxy group.

In the formula (1), as the alkyl group containing 1 to 6 carbon atoms and being substituted with a halogen atom, examples include, but are not limited to, a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a 2,2,2-trifluoroethyl group, a 2,2,1,1-tetrafluoroethyl group, a pentafluoroethyl group, a pentachloroethyl group, a pentafluoropropyl group, a nonafluorobutyl group, a 5-chloropentyl group, a 5,5,5-trichloropentyl group, a 5-fluoropentyl group, a 5,5,5-trifluoropentyl group, a 6-chlorohexyl group, a 6,6,6-trichlorohexyl group, a 6-fluorohexyl group and a 6,6,6-trifluorohexyl group.

In the formula (1), as the substituted amino group substituted with an alkyl group containing 1 to 6 carbon atoms, examples include, but are not limited to, a dimethylamino group, a diethylamino group, a di-n-propylamino group, a di-i-propylamino group and a methylethylamino group.

The aryl group containing 6 to 18 carbon atoms is optionally substituted. The substituent of the aryl group as $X^1$ and $X^2$ is preferably a hydrocarbon group containing 1 to 6 carbon atoms or a halogen atom. That is, the aryl group as $X^1$ and $X^2$ is preferably an aryl group containing 6 to 18 carbon atoms and optionally being substituted with a halogen atom or a hydrocarbon group containing 1 to 6 carbon atoms. The hydrocarbon group containing 1 to 6 carbon atoms may be an alkyl group containing 1 to 6 carbon atoms.

As the aryl group containing 6 to 18 carbon atoms and optionally being substituted with the hydrocarbon group containing 1 to 6 carbon atoms, examples include, but are not limited to, a phenyl group, a 2-methylphenyl group, a 3-methylphenyl group, a 4-methylphenyl group, a 2,4-dimethylphenyl group, a 2,5-dimethylphenyl group, a 2,6-dimethylphenyl group, a 3,5-dimethylphenyl group, a 2-ethylphenyl group, a 3-ethylphenyl group, a 4-ethylphenyl group, a 2,4,6-trimethylphenyl group, a 2,3,4-trimethylphenyl group, a 2,4,5-trimethylphenyl group, a 3,4,5-trimethylphenyl group, a 2-i-propylphenyl group, a 3-i-propylphenyl group, a 4-i-propylphenyl group, a 2-t-butylphenyl group, a 3-t-butylphenyl group, a 4-t-butylphenyl group, a 2,4-di-t-butylphenyl group, a 2,5-di-t-butylphenyl group, a 2,6-di-t-butylphenyl group, a 3,5-di-t-butylphenyl group, a biphenylyl group, a 1-naphthyl group, a 2-naphthyl group, an acenaphthyl group, a phenanthryl group and an anthryl group.

As the aryl group containing 6 to 18 carbon atoms and being substituted with a halogen atom, examples include, but are not limited to, a 2-fluorophenyl group, a 3-fluorophenyl group, a 4-fluorophenyl group, a 2-chlorophenyl group, a 3-chlorophenyl group, a 4-chlorophenyl group, a 2-bromophenyl group, a 3-bromophenyl group, a 4-bromophenyl group, a 2,4-difluorophenyl group, a 2,5-difluorophenyl group, a 2,6-difluorophenyl group, a 3,5-difluorophenyl group, a 2,4-dichlorophenyl group, a 2,5-dichlorophenyl group, a 2,6-dichlorophenyl group, a 3,5-dichlorophenyl group, a 2,4,6-trifluorophenyl group, a 2,3,4-trifluorophenyl group, a 2,4,5-trifluorophenyl group, a 3,4,5-trifluorophenyl group, a 2,4,6-trichlorophenyl group, a 2,3,4-trichlorophenyl group, a 2,4,5-trichlorophenyl group, a 3,4,5-trichlorophenyl group, a pentafluorophenyl group, a pentachlorophenyl group, a 3,5-dimethyl-4-chlorophenyl group and a 3,5-dichloro-4-biphenylyl group.

From the viewpoint of high catalyst activation, as $X^1$ and $X^2$, a halogen atom or a hydrocarbon group containing 1 to 6 carbon atoms is preferred. More specifically, a chlorine atom, a bromine atom, an iodine atom, a methyl group, an ethyl group, an i-butyl group or a phenyl group is particularly preferred.

Q is an alkylene group containing 1 to 20 carbon atoms and optionally being substituted with an aryl group containing 6 to 18 carbon atoms, a silylene group optionally being substituted with a hydrocarbon group containing 1 to 20 carbon atoms, or a substituted germylene, phosphorus, amino, boron or alumylene group being substituted with a hydrocarbon group containing 1 to 20 carbon atoms.

In the alkylene group containing 1 to 20 carbon atoms and optionally being substituted with an aryl group containing 6 to 18 carbon atoms, the alkylene group may be linear, branched, cyclic, or a combination thereof. The alkylene group containing 1 to 20 carbon atoms and optionally being substituted with an aryl group containing 6 to 18 carbon atoms, is preferably an alkylene group containing 1 to 6 carbon atoms and optionally being substituted with an aryl group containing 6 to 10 carbon atoms, and more preferably an alkylene group containing 1 or 2 carbon atoms and optionally being substituted with a phenyl group.

As the alkylene group containing 1 to 20 carbon atoms and optionally being substituted with an aryl group containing 6 to 18 carbon atoms, examples include, but are not limited to, a methylene group, an ethylene group, an isopropylene group, a phenylmethylmethylene group, a diphenylmethylene group and a cyclohexylene group.

As the hydrocarbon group optionally being substituted, examples include, but are not limited to, an alkyl group which may be linear, branched, cyclic or a combination thereof, an aryl group optionally being substituted with the alkyl group, and an alkyl group optionally being substituted with the aryl group. Substituted hydrocarbon groups may be bound to each other to form a ring with a silicon or germanium atom. The hydrocarbon groups forming the ring may include an unsaturated bond. When the ring is formed, it is preferably a 4- to 7-membered ring, and more preferably a 4- or 5-membered ring.

As the silylene group optionally being substituted with a hydrocarbon group containing 1 to 20 carbon atoms, examples include, but are not limited to, a silylene group, a dimethylsilylene group, a silacyclobutylene group, a silacyclopentylene group, a silacyclohexylene group, a phenylmethylsilylene group, a diphenylsilylene group, a disilylene group and a tetramethyldisilylene group.

As the substituted germylene group being substituted with a hydrocarbon group containing 1 to 20 carbon atoms, examples include, but are not limited to, a $(CH_3)_2Ge$ group and a $(C_6H_5)_2Ge$ group. As the substituted phosphorus group being substituted with a hydrocarbon group containing 1 to 20 carbon atoms, examples include, but are not limited to, a $(CH_3)P$ group and a $(C_6H_5)P$ group. As the substituted amino group being substituted with a hydrocarbon group containing 1 to 20 carbon atoms, examples include, but are not limited to, a $(C_4H_9)N$ group and a $(C_6H_5)N$ group. As the substituted boron group being substituted with a hydrocarbon group containing 1 to 20 carbon atoms, examples include, but are not limited to, a $(CH_3)B$ group, a $(C_4H_9)B$ group and a $(C_6H_5)B$ group. As the substituted alumylene group being substituted with a hydrocarbon group containing 1 to 20 carbon atoms, examples include, but are not limited to, a $(C_6H_5)Al$ group.

From the viewpoint of high catalyst activation, Q is preferably an alkylene group containing 1 to 20 carbon atoms and optionally being substituted with an aryl group containing 6 to 18 carbon atoms, or a silylene group optionally being substituted with a hydrocarbon group containing 1 to 20 carbon atoms. Q is more preferably an alkylene group containing 1 to 6 carbon atoms and optionally being substituted with a phenyl group, or a silylene group optionally being substituted with a hydrocarbon group containing 1 to 12 carbon atoms. Among them, Q is still more preferably a silylene group optionally being substituted with a hydrocarbon group containing 1 to 7 carbon atoms, such as a dimethylsilylene group, a silacyclobutylene group, a silacyclopentylene group, a cyclohexylene group and a phenylmethylsilylene group.

Each of $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ is independently a hydrogen atom, a halogen atom, an alkyl group containing 1 to 6 carbon atoms, an alkoxy group containing 1 to 6 carbon atoms, an alkyl group containing 1 to 6 carbon atoms and being substituted with a halogen atom, an alkyl group containing 1 to 6 carbon atoms and being substituted with a trialkylsilyl group, a substituted silyl group being substituted with a hydrocarbon group containing 1 to 6 carbon atoms, an aryl group containing 6 to 18 carbon atoms and optionally being substituted, a furyl group optionally being substituted, or a thienyl group optionally being substituted, and $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ optionally form a 5- to 7-membered ring with adjacent substituents, the ring optionally including an unsaturated bond.

In $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$, the halogen atom, the alkyl group containing 1 to 6 carbon atoms, the alkoxy group containing 1 to 6 carbon atoms, and the alkyl group containing 1 to 6 carbon atoms and being substituted with a halogen atom may be the same as those described in $X^1$ and $X^2$.

As the alkyl group containing 1 to 6 carbon atoms and being substituted with a trialkylsilyl group, examples include, but are not limited to, a (trimethylsilyl)methyl group, a (triethylsilyl)methyl group, a (t-butyldimethylsilyl) methyl group and a (trimethylsilyl)ethyl group.

The substituted silyl group being substituted with a hydrocarbon group containing 1 to 6 carbon atoms, is a substituent such that each of three hydrocarbon groups each containing 1 to 6 carbon atoms, is independently substituted on a silicon atom. Each hydrocarbon group containing 1 to 6 carbon atoms includes an alkyl group containing 1 to 6 carbon atoms, an alkenyl group containing 1 to 6 carbon atoms, and a phenyl group, and the phenyl group is optionally substituted with an alkyl group or the like. As the substituted silyl group, examples include, but are not limited to, a trimethylsilyl group, a triethylsilyl group, a tri-n-butylsilyl group, a t-butyldimethylsilyl group, a trivinylsilyl group, a triallylsilyl group and a triphenylsilyl group.

The aryl group containing 6 to 18 carbon atoms and optionally being substituted, the furyl group optionally being substituted, and the thienyl group optionally being substituted are a substituted or unsubstituted aryl group containing 6 to 18 carbon atoms, a substituted or unsubstituted furyl group, and a substituted or unsubstituted thienyl group, respectively.

As the substituent of the aryl, furyl or thienyl group as $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$, examples include, but are not limited to, a halogen atom, an alkyl group containing 1 to 6 carbon atoms, an alkoxy group containing 1 to 6 carbon atoms, an alkyl group containing 1 to 6 carbon atoms and being substituted with a halogen atom, an alkyl group containing 1 to 6 carbon atoms and being substituted with a trialkylsilyl group, an aryl group containing 6 to 18 carbon atoms and optionally being substituted with an alkyl group containing 1 to 6 carbon atoms, an aryl group containing 6 to 18 carbon atoms and being substituted with a halogen atom, and a substituted silyl group being substituted with a hydrocarbon group containing 1 to 6 carbon atoms. Examples of the halogen atom, the alkyl group containing 1 to 6 carbon atoms, the alkoxy group containing 1 to 6 carbon atoms, the alkyl group containing 1 to 6 carbon atoms and being substituted with a halogen atom, the alkyl group containing 1 to 6 carbon atoms and being substituted with a trialkylsilyl group, the aryl group containing 6 to 18 carbon atoms and optionally being substituted with an alkyl group containing 1 to 6 carbon atoms, the aryl group containing 6 to 18 carbon atoms and being substituted with a halogen atom, and the substituted silyl group being substituted with a hydrocarbon group containing 1 to 6 carbon atoms, may be those exemplified above.

As the aryl group containing 6 to 18 carbon atoms and optionally being substituted, examples include, but are not limited to, those exemplified above as the aryl group containing 6 to 18 carbon atoms and optionally being substituted with the hydrocarbon group containing 1 to 6 carbon atoms or a halogen atom; moreover, examples include, but are not limited to, a 4-methoxyphenyl group, a 4-trifluoromethylphenyl group and a 4-trimethylsilylphenyl group.

As the furyl group optionally being substituted, examples include, but are not limited to, a 2-furyl group, a 2-(5-methylfuryl) group, a 2-(5-ethylfuryl) group, a 2-(5-n-propylfuryl) group, a 2-(5-i-propylfuryl) group, a 2-(5-t-butylfuryl) group, a 2-(5-trimethylsilylfuryl) group, a 2-(5-triethylsilylfuryl) group, a 2-(5-phenylfuryl) group, a 2-(5-tolylfuryl) group, a 2-(5-fluorophenylfuryl) group, a 2-(5-chlorophenylfuryl) group, a 2-(4,5-dimethylfuryl) group, a 2-(3,5-dimethylfuryl) group, a 2-benzofuryl group, a 3-furyl group, a 3-(5-methylfuryl) group, a 3-(5-ethylfuryl) group, a 3-(5-n-propylfuryl) group, a 3-(5-i-propylfuryl) group, a 3-(5-t-butylfuryl) group, a 3-(5-trimethylsilylfuryl) group, a 3-(5-triethylsilylfuryl) group, a 3-(5-phenylfuryl) group, a 3-(5-tolylfuryl) group, a 3-(5-fluorophenylfuryl) group, a 3-(5-chlorophenylfuryl) group, a 3-(4,5-dimethylfuryl) group and a 3-benzofuryl group.

As the thienyl group optionally being substituted, examples include, but are not limited to, a 2-thienyl group, a 2-(5-methylthienyl) group, a 2-(5-ethylthienyl) group, a 2-(5-n-propylthienyl) group, a 2-(5-i-propylthienyl) group, a 2-(5-t-butylthienyl) group, a 2-(5-trimethylsilylthienyl) group, a 2-(5-triethylsilylthienyl) group, a 2-(5-phenylthienyl) group, a 2-(5-tolylthienyl) group, a 2-(5-fluorophenylthienyl) group, a 2-(5-chlorophenylthienyl) group, a 2-(4,5-dimethylthienyl) group, a 2-(3,5-dimethylthienyl) group, a 2-benzothienyl group, a 3-thienyl group, a 3-(5-methylthienyl) group, a 3-(5-ethylthienyl) group, a 3-(5-n-propylthienyl) group, a 3-(5-i-propylthienyl) group, a 3-(5-t-butylthienyl) group, a 3-(5-trimethylsilylthienyl) group, a 3-(5-triethylsilylthienyl) group, a 3-(5-phenylthienyl) group, a 3-(5-tolylthienyl) group, a 3-(5-fluorophenylthienyl) group, a 3-(5-chlorophenylthienyl) group, a 3-(4,5-dimethylthienyl) group and a 3-benzothienyl group.

$R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ optionally form a 5- to 7-membered ring with adjacent substituents, the ring optionally including an unsaturated bond.

Each of $R^{11}$ and $R^{21}$ is independently a hydrogen atom, an alkyl group containing 1 to 6 carbon atoms, an alkoxy group containing 1 to 6 carbon atoms, a furyl group optionally being substituted, or a thienyl group optionally being substituted. From the viewpoint of high catalyst activation, it is preferable that one or each of $R^1$ and $R^{11}$ is a furyl group optionally being substituted or thienyl group optionally being substituted. It is preferable that each of $R^{11}$ and $R^{21}$ is independently an alkyl group containing 1 to 6 carbon atoms, a furyl group optionally being substituted, or a thienyl group optionally being substituted, and it is more preferable that each of $R^{11}$ and $R^{21}$ is independently a furyl group optionally being substituted or a thienyl group optionally being substituted.

The furyl group optionally being substituted or the thienyl group optionally being substituted is preferably a group represented by the following formula (1a):

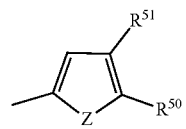

Formula (1a)

where Z is an oxygen atom or a sulfur atom; each of $R^{50}$ and $R^{51}$ is independently a hydrogen atom, a halogen atom, an alkyl group containing 1 to 6 carbon atoms, an alkoxy group containing 1 to 6 carbon atoms, an alkyl group containing 1 to 6 carbon atoms and being substituted with a halogen atom, a substituted silyl group being substituted with a hydrocarbon group containing 1 to 6 carbon atoms, or an aryl group containing 6 to 18 carbon atoms; and $R^{50}$ and $R^{51}$ optionally form a 5- to 7-membered ring with adjacent substituents, the ring optionally including an unsaturated bond.

In the formula (1a), $R^{51}$ is preferably a hydrogen atom, a halogen atom, an alkyl group containing 1 to 6 carbon atoms, or an aryl group containing 6 to 18 carbon atoms, and more preferably a hydrogen atom or an alkyl group containing 1 to 6 carbon atoms. $R^{50}$ is preferably a halogen atom, an alkyl group containing 1 to 6 carbon atoms, or an aryl group containing 6 to 18 carbon atoms, and more preferably an alkyl group containing 1 to 6 carbon atoms or an aryl group containing 6 to 18 carbon atoms.

From the viewpoint of high catalyst activation, $R^{12}$ and $R^{22}$ are preferably a hydrogen atom each.

It is preferable that each of $R^{13}$ and $R^{23}$ is independently an alkoxy group containing 1 to 6 carbon atoms, a halogen-containing alkyl group containing 1 to 6 carbon atoms, an alkyl group containing 1 to 6 carbon atoms and being substituted with a trialkylsilyl group, a furyl group, a thienyl group, a furyl group being substituted, a thienyl group being substituted, or an aryl group containing 6 to 18 carbon atoms and optionally being substituted. It is more preferable that each of $R^{13}$ and $R^{23}$ is independently an aryl group containing 6 to 18 carbon atoms and optionally being substituted with a halogen atom, or an aryl group containing 6 to 18 carbon atoms and optionally being substituted with an alkyl group containing 1 to 6 carbon atoms.

From the viewpoint of high catalyst activation, each of $R^{14}$ and $R^{24}$ is independently a hydrogen atom, a halogen atom, an alkyl group containing 1 to 6 carbon atoms, an alkoxy group containing 1 to 6 carbon atoms, an alkyl group containing 1 to 6 carbon atoms and being substituted with a halogen atom, an alkyl group containing 1 to 6 carbon atoms and being substituted with a trialkylsilyl group, an aryl group containing 6 to 18 carbon atoms and optionally being substituted with an alkyl group containing 1 to 6 carbon atoms, or an aryl group containing 6 to 18 carbon atoms and being substituted with a halogen atom. It is more preferable that each of $R^{14}$ and $R^{24}$ is independently a hydrogen atom, an alkyl group containing 1 to 6 carbon atoms, or an alkoxy group containing 1 to 6 carbon atoms. It is particularly preferable that each of $R^{14}$ and $R^{24}$ is independently a hydrogen atom or a methyl group.

From the viewpoint of high catalyst activation, it is preferable that each of $R^{15}$ and $R^{25}$ is independently a hydrogen atom, a halogen atom, an alkyl group containing 1 to 6 carbon atoms, an alkoxy group containing 1 to 6 carbon atoms, an alkyl group containing 1 to 6 carbon atoms and being substituted with a halogen atom, an alkyl group containing 1 to 6 carbon atoms and being substituted with a trialkylsilyl group, an aryl group containing 6 to 18 carbon atoms and optionally being substituted with an alkyl group containing 1 to 6 carbon atoms, or an aryl group containing 6 to 18 carbon atoms and being substituted with a halogen atom. It is more preferable that each of $R^{15}$ and $R^{25}$ is independently a hydrogen atom or an alkyl group containing 1 to 6 carbon atoms. It is particularly preferable that each of $R^{15}$ and $R^{25}$ is independently a hydrogen atom or a methyl group.

$R^{14}$, $R^{15}$, $R^{24}$ and $R^{25}$ optionally form a 5- to 7-membered ring with adjacent substituents, the ring optionally including an unsaturated bond.

From the viewpoint of high catalyst activation, it is preferable that each of $R^{16}$ and $R^{26}$ is independently a hydrogen atom, an alkyl group containing 1 to 6 carbon atoms or an alkoxy group containing 1 to 6 carbon atoms. It is particularly preferable that each of $R^{16}$ and $R^{26}$ is independently a hydrogen atom.

From the viewpoint of high catalyst activation, the metallocene complex represented by the general formula (1) is more preferably a metallocene complex represented by the following general formula (1-1):

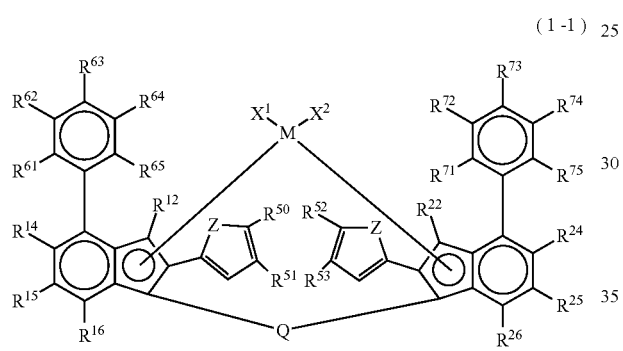

(1-1)

where Z is an oxygen atom or a sulfur atom; each of $R^{50}$, $R^{51}$, $R^{52}$ and $R^{53}$ is independently a hydrogen atom, a halogen atom, an alkyl group containing 1 to 6 carbon atoms, an alkoxy group containing 1 to 6 carbon atoms, an alkyl group containing 1 to 6 carbon atoms and being substituted with a halogen atom, a substituted silyl group being substituted with a hydrocarbon group containing 1 to 6 carbon atoms, or an aryl group containing 6 to 18 carbon atoms; $R^{50}$, $R^{51}$, $R^{52}$ and $R^{53}$ optionally form a 5- to 7-membered ring with adjacent substituents, the ring optionally including an unsaturated bond; each of $R^{61}$, $R^{62}$, $R^{63}$, $R^{64}$, $R^{65}$, $R^{71}$, $R^{72}$, $R^{73}$, $R^{74}$ and $R^{75}$ is independently a hydrogen atom, a halogen atom, an alkyl group containing 1 to 6 carbon atoms, an alkoxy group containing 1 to 6 carbon atoms, an alkyl group containing 1 to 6 carbon atoms and being substituted with a halogen atom, an alkyl group containing 1 to 6 carbon atoms and being substituted with a trialkylsilyl group, a substituted silyl group being substituted with a hydrocarbon group containing 1 to 6 carbon atoms, an aryl group containing 6 to 18 carbon atoms and optionally being substituted with a halogen atom, a furyl group optionally being substituted, or a thienyl group optionally being substituted; $R^{61}$, $R^{62}$, $R^{63}$, $R^{64}$, $R^{65}$, $R^{71}$, $R^{72}$, $R^{73}$, $R^{74}$ and $R^{75}$ optionally form a 5- to 7-membered ring with adjacent substituents, the ring optionally including an unsaturated bond; and M, $X^1$, $X^2$, Q, $R^{12}$, $R^{14}$, $R^{15}$, $R^{16}$, $R^{22}$, $R^{24}$, $R^{25}$ and $R^{26}$ are the same as those of the general formula (1) described above.

Z is an oxygen atom or a sulfur atom, and it is particularly preferably an oxygen atom.

Each of the substituents $R^{51}$ and $R^{53}$ is preferably a hydrogen atom, a halogen atom, an alkyl group containing 1 to 6 carbon atoms, or an aryl group containing 6 to 18 carbon atoms, and more preferably a hydrogen atom or an alkyl group containing 1 to 6 carbon atoms. Each of the substituents $R^{50}$ and $R^{52}$ is preferably a halogen atom, an alkyl group containing 1 to 6 carbon atoms or an aryl group containing 6 to 18 carbon atoms, more preferably an alkyl group containing 1 to 6 carbon atoms or an aryl group containing 6 to 18 carbon atoms, and particularly preferably a methyl group.

It is preferable that each of $R^{61}$, $R^{62}$, $R^{63}$, $R^{64}$, $R^{65}$, $R^{71}$, $R^{72}$, $R^{73}$, $R^{74}$ and $R^{75}$ is independently a hydrogen atom, a halogen atom, an alkyl group containing 1 to 6 carbon atoms, an alkyl group containing 1 to 6 carbon atoms and being substituted with a trialkylsilyl group, or an aryl group containing 6 to 18 carbon atoms. It is particularly preferable that each of $R^{61}$, $R^{65}$, $R^{71}$ and $R^{75}$ is independently a hydrogen atom.

$R^{61}$, $R^{62}$, $R^{63}$, $R^{64}$, $R^{65}$, $R^{71}$, $R^{72}$, $R^{73}$, $R^{74}$ and $R^{75}$ optionally form a 5- to 7-membered ring with adjacent substituents, the ring optionally including an unsaturated bond. As the substituent at the 4-position of the indenyl ring, examples include, but are not limited to, a 1-naphthyl group, a 2-naphthyl group, a 5,6,7,8-tetrahydro-1-naphthyl group, a 5,6,7,8-tetrahydro-2-naphthyl group, a phenanthryl group and an anthryl group.

As the metallocene complex represented by the general formula (1), examples include, but are not limited to, the following:

(1) Dichloro[silacyclobutylene bis{2-(2-furyl)-4-phenyl-1-indenyl}]zirconium
(2) Dichloro[silacyclobutylene bis{2-(5-methyl-2-furyl)-4-phenyl-1-indenyl}]zirconium
(3) Dichloro[silacyclobutylene bis{2-(4,5-dimethyl-2-furyl)-4-phenyl-1-indenyl}]zirconium
(4) Dichloro[silacyclobutylene bis{2-(5-t-butyl-2-furyl)-4-phenyl-1-indenyl}]zirconium
(5) Dichloro[silacyclobutylene bis{2-(5-phenyl-2-furyl)-4-phenyl-1-indenyl}]zirconium
(6) Dichloro[silacyclobutylene bis{2-(2-thienyl)-4-phenyl-1-indenyl}]zirconium
(7) Dichloro[silacyclobutylene bis{2-(5-methyl-2-thienyl)-4-phenyl-1-indenyl}]zirconium
(8) Dichloro[silacyclobutylene bis{2-(5-methyl-2-furyl)-4-(4-fluorophenyl)-1-indenyl}]zirconium
(9) Dichloro[silacyclobutylene bis{2-(5-methyl-2-furyl)-4-(4-chlorophenyl)-1-indenyl}]zirconium
(10) Dichloro[silacyclobutylene bis{2-(5-methyl-2-furyl)-4-(4-methylphenyl)-1-indenyl}]zirconium
(11) Dichloro[silacyclobutylene bis{2-(5-methyl-2-furyl)-4-(4-i-propylphenyl)-1-indenyl}]zirconium
(12) Dichloro[silacyclobutylene bis{2-(5-methyl furyl)-4-(4-t-butylphenyl)-1-indenyl}]zirconium
(13) Dichloro[silacyclobutylene bis{2-(5-methyl furyl)-4-(3,5-dimethylphenyl)-1-indenyl}]zirconium
(14) Dichloro[silacyclobutylene bis{2-(5-methyl furyl)-4-(3,5-di-t-butylphenyl)-1-indenyl}]zirconium
(15) Dichloro[silacyclobutylene bis{2-(5-methyl furyl)-4-(1-naphthyl)-1-indenyl}]zirconium
(16) Dichloro[silacyclobutylene bis{2-(5-methyl-2-furyl)-4-(2-naphthyl)-1-indenyl}]zirconium
(17) Dichloro[silacyclobutylene bis{2-(5-methyl-2-furyl)-4-(4-biphenylyl)-1-indenyl}]zirconium

(18) Dichloro[silacyclobutylene bis{2-(2-furyl)-4-phenyl-5-methyl-1-indenyl}]zirconium
(19) Dichloro[silacyclobutylene bis{2-(5-methyl-2-furyl)-4-phenyl-5-methyl-1-indenyl}]zirconium
(20) Dichloro[silacyclobutylene bis{2-(4,5-dimethyl-2-furyl)-4-phenyl-5-methyl-1-indenyl}]zirconium
(21) Dichloro[silacyclobutylene bis{2-(5-t-butyl-2-furyl)-4-phenyl-5-methyl-1-indenyl}]zirconium
(22) Dichloro[silacyclobutylene bis{2-(5-phenyl-2-furyl)-4-phenyl-5-methyl-1-indenyl}]zirconium
(23) Dichloro[silacyclobutylene bis{2-(2-thienyl)-4-phenyl-5-methyl-1-indenyl}]zirconium
(24) Dichloro[silacyclobutylene bis{2-(5-methyl-2-thienyl)-4-phenyl-5-methyl-1-indenyl}]zirconium
(25) Dichloro[silacyclobutylene bis{2-(5-methyl-2-furyl)-4-(4-fluorophenyl)-5-methyl-1-indenyl}]zirconium
(26) Dichloro[silacyclobutylene bis{2-(5-methyl-2-furyl)-4-(4-chlorophenyl)-5-methyl-1-indenyl}]zirconium
(27) Dichloro[silacyclobutylene bis{2-(5-methyl-2-furyl)-4-(4-methylphenyl)-5-methyl-1-indenyl}]zirconium
(28) Dichloro[silacyclobutylene bis{2-(5-methyl furyl)-4-(4-i-propylphenyl)-5-methyl-1-indenyl}]zirconium
(29) Dichloro[silacyclobutylene bis{2-(5-methyl furyl)-4-(4-t-butylphenyl)-5-methyl-1-indenyl}]zirconium
(30) Dichloro[silacyclobutylene bis{2-(5-methyl furyl)-4-(3,5-dimethylphenyl)-5-methyl-1-indenyl}]zirconium
(31) Dichloro[silacyclobutylene bis{2-(5-methyl furyl)-4-(3,5-di-t-butylphenyl)-5-methyl-1-indenyl}]zirconium
(32) Dichloro[silacyclobutylene bis{2-(5-methyl-2-furyl)-4-(1-naphthyl)-5-methyl-1-indenyl}]zirconium
(33) Dichloro[silacyclobutylene bis{2-(5-methyl-2-furyl)-4-(2-naphthyl)-5-methyl-1-indenyl}]zirconium
(34) Dichloro[silacyclobutylene bis{2-(5-methyl-2-furyl)-4-(4-biphenylyl)-5-methyl-1-indenyl}]zirconium
(35) Dichloro[silacyclobutylene bis{2-(2-furyl)-4-phenyl-5,6-dimethyl-1-indenyl}]zirconium
(36) Dichloro[silacyclobutylene bis{2-(5-methyl-2-furyl)-4-phenyl-5,6-dimethyl-1-indenyl}]zirconium
(37) Dichloro[silacyclobutylene bis{2-(4,5-dimethyl-2-furyl)-4-phenyl-5,6-dimethyl-1-indenyl}]zirconium
(38) Dichloro[silacyclobutylene bis{2-(5-t-butyl-2-furyl)-4-phenyl-5,6-dimethyl-1-indenyl}]zirconium
(39) Dichloro[silacyclobutylene bis{2-(5-phenyl-2-furyl)-4-phenyl-5,6-dimethyl-1-indenyl}]zirconium
(40) Dichloro[silacyclobutylene bis{2-(2-thienyl)-4-phenyl-5,6-dimethyl-1-indenyl}]zirconium
(41) Dichloro[silacyclobutylene bis{2-(5-methyl-2-thienyl)-4-phenyl-5,6-dimethyl-1-indenyl}]zirconium
(42) Dichloro[silacyclobutylene bis{2-(5-methyl-2-furyl)-4-(4-fluorophenyl)-5,6-dimethyl-1-indenyl}]zirconium
(43) Dichloro[silacyclobutylene bis{2-(5-methyl-2-furyl)-4-(4-chlorophenyl)-5,6-dimethyl-1-indenyl}]zirconium
(44) Dichloro[silacyclobutylene bis{2-(5-methyl furyl)-4-(4-methylphenyl)-5,6-dimethyl-1-indenyl}]zirconium
(45) Dichloro[silacyclobutylene bis{2-(5-methyl furyl)-4-(4-i-propylphenyl)-5,6-dimethyl-1-indenyl}]zirconium
(46) Dichloro[silacyclobutylene bis{2-(5-methyl furyl)-4-(4-t-butylphenyl)-5,6-dimethyl-1-indenyl}]zirconium
(47) Dichloro[silacyclobutylene bis{2-(5-methyl furyl)-4-(3,5-dimethylphenyl)-5,6-dimethyl indenyl}]zirconium
(48) Dichloro[silacyclobutylene bis{2-(5-methyl-2-furyl)-4-(3,5-di-t-butylphenyl)-5,6-dimethyl-1-indenyl}]zirconium
(49) Dichloro[silacyclobutylene bis{2-(5-methyl-2-furyl)-4-(1-naphthyl)-5,6-dimethyl-1-indenyl}]zirconium
(50) Dichloro[silacyclobutylene bis{2-(5-methyl-2-furyl)-4-(2-naphthyl)-5,6-dimethyl-1-indenyl}]zirconium
(51) Dichloro[silacyclobutylene bis{2-(5-methyl-2-furyl)-4-(4-biphenylyl)-5,6-dimethyl-1-indenyl}]zirconium
(52) Dichloro[silacyclobutylene bis{2-(2-furyl)-4-phenyl-1,5,6,7-tetrahydro-s-indacene-1-yl}]zirconium
(53) Dichloro[silacyclobutylene bis{2-(5-methyl-2-furyl)-4-phenyl-1,5,6,7-tetrahydro-s-indacene-1-yl}]zirconium
(54) Dichloro[silacyclobutylene bis{2-(4,5-dimethyl-2-furyl)-4-phenyl-1,5,6,7-tetrahydro-s-indacene-1-yl}]zirconium
(55) Dichloro[silacyclobutylene bis{2-(5-t-butyl-2-furyl)-4-phenyl-1,5,6,7-tetrahydro-s-indacene-1-yl}]zirconium
(56) Dichloro[silacyclobutylene bis{2-(5-phenyl-2-furyl)-4-phenyl-1,5,6,7-tetrahydro-s-indacene-1-yl}]zirconium
(57) Dichloro[silacyclobutylene bis{2-(2-thienyl)-4-phenyl-1,5,6,7-tetrahydro-s-indacene-1-yl}]zirconium
(58) Dichloro[silacyclobutylene bis{2-(5-methyl-2-thienyl)-4-phenyl-1,5,6,7-tetrahydro-s-indacene-1-yl}]zirconium
(59) Dichloro[silacyclobutylene bis{2-(5-methyl furyl)-4-(4-fluorophenyl)-1,5,6,7-tetrahydro-s-indacene yl}]zirconium
(60) Dichloro[silacyclobutylene bis{2-(5-methyl furyl)-4-(4-chlorophenyl)-1,5,6,7-tetrahydro-s-indacene yl}]zirconium
(61) Dichloro[silacyclobutylene bis{2-(5-methyl furyl)-4-(4-methylphenyl)-1,5,6,7-tetrahydro-s-indacene-1-yl}]zirconium
(62) Dichloro[silacyclobutylene bis{2-(5-methyl-2-furyl)-4-(4-i-propylphenyl)-1,5,6,7-tetrahydro-s-indacene-1-yl}]zirconium
(63) Dichloro[silacyclobutylene bis{2-(5-methyl-2-furyl)-4-(4-t-butylphenyl)-1,5,6,7-tetrahydro-s-indacene-1-yl}]zirconium
(64) Dichloro[silacyclobutylene bis{2-(5-methyl-2-furyl)-4-(3,5-dimethylphenyl)-1,5,6,7-tetrahydro-s-indacene-1-yl}]zirconium
(65) Dichloro[silacyclobutylene bis{2-(5-methyl-2-furyl)-4-(3,5-di-t-butylphenyl)-1,5,6,7-tetrahydro-s-indacene-1-yl}]zirconium
(66) Dichloro[silacyclobutylene bis{2-(5-methyl-2-furyl)-4-(1-naphthyl)-1,5,6,7-tetrahydro-s-indacene-1-yl}]zirconium
(67) Dichloro[silacyclobutylene bis{2-(5-methyl-2-furyl)-4-(2-naphthyl)-1,5,6,7-tetrahydro-s-indacene-1-yl}]zirconium
(68) Dichloro[silacyclobutylene bis{2-(5-methyl-2-furyl)-4-(4-biphenylyl)-1,5,6,7-tetrahydro-s-indacene-1-yl}]zirconium

(69) Dichloro[silacyclobutylene bis{2-(2-furyl)-4-phenyl-1,5,6,7-tetrahydro-5,5,7,7-tetramethyl-s-indacene-1-yl}]zirconium
(70) Dichloro[silacyclobutylene bis{2-(5-methyl furyl)-4-phenyl-1,5,6,7-tetrahydro-5,5,7,7-tetramethyl-s-indacene-1-yl}]zirconium
(71) Dichloro[silacyclobutylene{2-(5-methyl-2-furyl)phenyl-5-methyl-1-indenyl}{2,5-dimethyl-4-phenyl indenyl}]zirconium
(72) Dichloro[silacyclobutylene{2-(5-methyl-2-furyl)-4-phenyl-5-methyl-1-indenyl}{2-(2-furyl)-4-phenyl-5-methyl-1-indenyl}]zirconium
(73) Dichloro[silacyclobutylene{2-(5-methyl-2-furyl)-4-phenyl-5-methyl-1-indenyl}{2-(5-t-butyl-2-furyl)-4-phenyl-5-methyl-1-indenyl}]zirconium
(74) Dichloro[silacyclobutylene{2-(5-methyl-2-furyl)-4-phenyl-5-methyl-1-indenyl}{2-(5-methyl-2-furyl)-4-phenyl-1-indenyl}]zirconium
(75) Dichloro[silacyclobutylene{2-(5-methyl-2-furyl)-4-phenyl-5-methyl-1-indenyl}{2-(5-methyl-2-furyl)-4-phenyl-5,6-dimethyl-1-indenyl}]zirconium
(76) Dichloro[silacyclobutylene{2-(5-methyl-2-furyl)-4-phenyl-5-methyl-1-indenyl}{2-(5-methyl-2-furyl)-4-phenyl-1,5,6,7-tetrahydro-s-indacene-1-yl}]zirconium
(77) Dichloro[silacyclopentylene bis{2-(2-furyl)-4-phenyl-5-methyl-1-indenyl}]zirconium
(78) Dichloro[silacyclopentylene bis{2-(5-methyl-2-furyl)-4-phenyl-5-methyl-1-indenyl}]zirconium
(79) Dichloro[silacyclopentylene bis{2-(2-furyl)-4-phenyl-1,5,6,7-tetrahydro-s-indacene-1-yl}]zirconium
(80) Dichloro[silacyclopentylene bis{2-(5-methyl-2-furyl)-4-phenyl-1,5,6,7-tetrahydro-s-indacene-1-yl}]zirconium
(81) Dichloro[dimethylsilylene bis{2-(2-furyl)-4-phenyl-1-indenyl}]zirconium
(82) Dichloro[dimethylsilylene bis{2-(5-methyl-2-furyl)-4-phenyl-1-indenyl}]zirconium
(83) Dichloro[dimethylsilylene bis{2-(4,5-dimethyl furyl)-4-phenyl-1-indenyl}]zirconium
(84) Dichloro[dimethylsilylene bis{2-(5-t-butyl furyl)-4-phenyl-1-indenyl}]zirconium
(85) Dichloro[dimethylsilylene bis{2-(5-phenyl-2-furyl)-4-phenyl-1-indenyl}]zirconium
(86) Dichloro[dimethylsilylene bis{2-(2-thienyl)-4-phenyl-1-indenyl}]zirconium
(87) Dichloro[dimethylsilylene bis{2-(5-methyl-2-thienyl)-4-phenyl-1-indenyl}]zirconium
(88) Dichloro[dimethylsilylene bis{2-(5-methyl-2-furyl)-4-(4-fluorophenyl)-1-indenyl}]zirconium
(89) Dichloro[dimethylsilylene bis{2-(5-methyl-2-furyl)-4-(4-chlorophenyl)-1-indenyl}]zirconium
(90) Dichloro[dimethylsilylene bis{2-(5-methyl-2-furyl)-4-(4-methylphenyl)-1-indenyl}]zirconium
(91) Dichloro[dimethylsilylene bis{2-(5-methyl-2-furyl)-4-(4-i-propylphenyl)-1-indenyl}]zirconium
(92) Dichloro[dimethylsilylene bis{2-(5-methyl-2-furyl)-4-(4-t-butylphenyl)-1-indenyl}]zirconium
(93) Dichloro[dimethylsilylene bis{2-(5-methyl-2-furyl)-4-(3,5-dimethylphenyl)-1-indenyl}]zirconium
(94) Dichloro[dimethylsilylene bis{2-(5-methyl-2-furyl)-4-(3,5-di-t-butylphenyl)-1-indenyl}]zirconium
(95) Dichloro[dimethylsilylene bis{2-(5-methyl-2-furyl)-4-(1-naphthyl)-1-indenyl}]zirconium
(96) Dichloro[dimethylsilylene bis{2-(5-methyl-2-furyl)-4-(2-naphthyl)-1-indenyl}]zirconium
(97) Dichloro[dimethylsilylene bis{2-(5-methyl-2-furyl)-4-(4-biphenylyl)-1-indenyl}]zirconium
(98) Dichloro[dimethylsilyl bis{2-(2-furyl)-4-phenyl methyl-1-indenyl}]zirconium
(99) Dichloro[dimethylsilyl bis{2-(5-methyl-2-furyl)phenyl-5-methyl-1-indenyl}]zirconium
(100) Dichloro[dimethylsilyl bis{2-(4,5-dimethyl furyl)-4-phenyl-5-methyl-1-indenyl}]zirconium
(101) Dichloro[dimethylsilyl bis{2-(5-t-butyl-2-furyl)-4-phenyl-5-methyl-1-indenyl}]zirconium
(102) Dichloro[dimethylsilyl bis{2-(5-phenyl-2-furyl)-4-phenyl-5-methyl-1-indenyl}]zirconium
(103) Dichloro[dimethylsilyl bis{2-(2-thienyl)-4-phenyl-5-methyl-1-indenyl}]zirconium
(104) Dichloro[dimethylsilyl bis{2-(5-methyl-2-thienyl)-4-phenyl-5-methyl-1-indenyl}]zirconium
(105) Dichloro[dimethylsilyl bis{2-(5-methyl-2-furyl)-4-(4-fluorophenyl)-5-methyl-1-indenyl}]zirconium
(106) Dichloro[dimethylsilyl bis{2-(5-methyl-2-furyl)-4-(4-chlorophenyl)-5-methyl-1-indenyl}]zirconium
(107) Dichloro[dimethylsilyl bis{2-(5-methyl-2-furyl)-4-(4-methylphenyl)-5-methyl-1-indenyl}]zirconium
(108) Dichloro[dimethylsilyl bis{2-(5-methyl-2-furyl)-4-(4-i-propylphenyl)-5-methyl-1-indenyl}]zirconium
(109) Dichloro[dimethylsilyl bis{2-(5-methyl-2-furyl)-4-(4-t-butylphenyl)-5-methyl-1-indenyl}]zirconium
(110) Dichloro[dimethylsilyl bis{2-(5-methyl-2-furyl)-4-(3,5-dimethylphenyl)-5-methyl-1-indenyl}]zirconium
(111) Dichloro[dimethylsilyl bis{2-(5-methyl-2-furyl)-4-(3,5-di-t-butylphenyl)-5-methyl-1-indenyl}]zirconium
(112) Dichloro[dimethylsilyl bis{2-(5-methyl-2-furyl)-4-(1-naphthyl)-5-methyl-1-indenyl}]zirconium
(113) Dichloro[dimethylsilyl bis{2-(5-methyl-2-furyl)(2-naphthyl)-5-methyl-1-indenyl}]zirconium
(114) Dichloro[dimethylsilyl bis{2-(5-methyl-2-furyl)(4-biphenylyl)-5-methyl-1-indenyl}]zirconium
(115) Dichloro[dimethylsilyl bis{2-(2-furyl)-4-phenyl-5,6-dimethyl-1-indenyl}]zirconium
(116) Dichloro[dimethylsilyl bis{2-(5-methyl-2-furyl)phenyl-5,6-dimethyl-1-indenyl}]zirconium
(117) Dichloro[dimethylsilyl bis{2-(4,5-dimethyl-2-furyl)-4-phenyl-5,6-dimethyl-1-indenyl}]zirconium
(118) Dichloro[dimethylsilyl bis{2-(5-t-butyl-2-furyl)-4-phenyl-5,6-dimethyl-1-indenyl}]zirconium
(119) Dichloro[dimethylsilyl bis{2-(5-phenyl-2-furyl)-4-phenyl-5,6-dimethyl-1-indenyl}]zirconium
(120) Dichloro[dimethylsilyl bis{2-(2-thienyl)-4-phenyl-5,6-dimethyl-1-indenyl}]zirconium
(121) Dichloro[dimethylsilyl bis{2-(5-methyl-2-thienyl)-4-phenyl-5,6-dimethyl-1-indenyl}]zirconium
(122) Dichloro[dimethylsilyl bis{2-(5-methyl-2-furyl)-4-(4-fluorophenyl)-5,6-dimethyl-1-indenyl}]zirconium
(123) Dichloro[dimethylsilyl bis{2-(5-methyl-2-furyl)-4-(4-chlorophenyl)-5,6-dimethyl-1-indenyl}]zirconium
(124) Dichloro[dimethylsilyl bis{2-(5-methyl-2-furyl)-4-(4-methylphenyl)-5,6-dimethyl-1-indenyl}]zirconium
(125) Dichloro[dimethylsilyl bis{2-(5-methyl-2-furyl)-4-(4-i-propylphenyl)-5,6-dimethyl-1-indenyl}]zirconium
(126) Dichloro[dimethylsilyl bis{2-(5-methyl-2-furyl)-4-(4-t-butylphenyl)-5,6-dimethyl-1-indenyl}]zirconium
(127) Dichloro[dimethylsilyl bis{2-(5-methyl-2-furyl)-4-(3,5-dimethylphenyl)-5,6-dimethyl-1-indenyl}]zirconium
(128) Dichloro[dimethylsilyl bis{2-(5-methyl-2-furyl)-4-(3,5-di-t-butylphenyl)-5,6-dimethyl-1-indenyl}]zirconium
(129) Dichloro[dimethylsilyl bis{2-(5-methyl-2-furyl)(1-naphthyl)-5,6-dimethyl-1-indenyl}]zirconium (130) Dichloro[dimethylsilyl bis{2-(5-methyl-2-furyl) (2-naphthyl)-5,6-dimethyl-1-indenyl}]zirconium
(131) Dichloro[dimethylsilyl bis{2-(5-methyl-2-furyl) (4-biphenylyl)-5,6-dimethyl-1-indenyl}]zirconium
(132) Dichloro[dimethylsilyl bis{2-(2-furyl)-4-phenyl-1,5,6,7-tetrahydro-s-indacene-1-yl}]zirconium
(133) Dichloro[dimethylsilyl bis{2-(5-methyl-2-furyl)-4-phenyl-1,5,6,7-tetrahydro-s-indacene-1-yl}]zirconium
(134) Dichloro[dimethylsilyl bis{2-(4,5-dimethyl-2-furyl)-4-phenyl-1,5,6,7-tetrahydro-s-indacene-1-yl}]zirconium
(135) Dichloro[dimethylsilyl bis{2-(5-t-butyl-2-furyl)-4-phenyl-1,5,6,7-tetrahydro-s-indacene-1-yl}]zirconium
(136) Dichloro[dimethylsilyl bis{2-(5-phenyl-2-furyl)-4-phenyl-1,5,6,7-tetrahydro-s-indacene-1-yl}]zirconium
(137) Dichloro[dimethylsilyl bis{2-(2-thienyl)-4-phenyl-1,5,6,7-tetrahydro-s-indacene-1-yl}]zirconium
(138) Dichloro[dimethylsilyl bis{2-(5-methyl-2-thienyl)-4-phenyl-1,5,6,7-tetrahydro-s-indacene-1-yl}]zirconium
(139) Dichloro[dimethylsilyl bis{2-(5-methyl-2-furyl)-4-(4-fluorophenyl)-1,5,6,7-tetrahydro-s-indacene-1-yl}]zirconium
(140) Dichloro[dimethylsilyl bis{2-(5-methyl-2-furyl)-4-(4-chlorophenyl)-1,5,6,7-tetrahydro-s-indacene-1-yl}]zirconium
(141) Dichloro[dimethylsilyl bis{2-(5-methyl-2-furyl)-4-(4-methylphenyl)-1,5,6,7-tetrahydro-s-indacene-1-yl}]zirconium
(142) Dichloro[dimethylsilyl bis{2-(5-methyl-2-furyl)-4-(4-i-propylphenyl)-1,5,6,7-tetrahydro-s-indacene-1-yl}]zirconium
(143) Dichloro[dimethylsilyl bis{2-(5-methyl-2-furyl)-4-(4-t-butylphenyl)-1,5,6,7-tetrahydro-s-indacene-1-yl}]zirconium
(144) Dichloro[dimethylsilyl bis{2-(5-methyl-2-furyl) (3,5-dimethylphenyl)-1,5,6,7-tetrahydro-s-indacene yl}]zirconium
(145) Dichloro[dimethylsilyl bis{2-(5-methyl-2-furyl) (3,5-di-t-butylphenyl)-1,5,6,7-tetrahydro-s-indacene yl}]zirconium
(146) Dichloro[dimethylsilyl bis{2-(5-methyl-2-furyl) (1-naphthyl)-1,5,6,7-tetrahydro-s-indacene-1-yl}]zirconium
(147) Dichloro[dimethylsilyl bis{2-(5-methyl-2-furyl)-4-(2-naphthyl)-1,5,6,7-tetrahydro-s-indacene-1-yl}]zirconium
(148) Dichloro[dimethylsilyl bis{2-(5-methyl-2-furyl)-4-(4-biphenylyl)-1,5,6,7-tetrahydro-s-indacene-1-yl}]zirconium
(149) Dichloro[dimethylsilyl bis{2-(2-furyl)-4-phenyl-1,5,6,7-tetrahydro-5,5,7,7-tetramethyl-s-indacene-1-yl}]zirconium
(150) Dichloro[dimethylsilyl bis{2-(5-methyl-2-furyl)-4-phenyl-1,5,6,7-tetrahydro-5,5,7,7-tetramethyl-s-indacene-1-yl}]zirconium
(151) Dichloro[dimethylsilyl{2-(5-methyl-2-furyl)-4-phenyl-5-methyl-1-indenyl}{2,5-dimethyl-4-phenyl-1-indenyl}]]zirconium
(152) Dichloro[dimethylsilyl{2-(5-methyl-2-furyl)-4-phenyl-5-methyl-1-indenyl}{2-(2-furyl)-4-phenyl-5-methyl-1-indenyl}]zirconium
(153) Dichloro[dimethylsilyl{2-(5-methyl-2-furyl)-4-phenyl-5-methyl-1-indenyl}{2-(5-t-butyl-2-furyl)-4-phenyl-5-methyl-1-indenyl}]zirconium
(154) Dichloro[dimethylsilyl{2-(5-methyl-2-furyl)-4-phenyl-5-methyl-1-indenyl}{2-(5-methyl-2-furyl)-4-phenyl-1-indenyl}]zirconium
(155) Dichloro[dimethylsilyl{2-(5-methyl-2-furyl)-4-phenyl-5-methyl-1-indenyl}{2-(5-methyl-2-furyl)-4-phenyl-5,6-dimethyl-1-indenyl}]zirconium
(156) Dichloro[dimethylsilyl{2-(5-methyl-2-furyl) phenyl-5-methyl-1-indenyl}{2-(5-methyl-2-furyl)-4-phenyl-1,5,6,7-tetrahydro-s-indacene-1-yl}]zirconium
(157) Dichloro[silacyclopentylene bis{2-(2-furyl) phenyl-5-methyl-1-indenyl}]zirconium
(158) Dichloro[silacyclopentylene bis{2-(5-methyl-2-furyl)-4-phenyl-5-methyl-1-indenyl}]zirconium
(159) Dichloro[silacyclopentylene bis{2-(2-furyl)-4-phenyl-1,5,6,7-tetrahydro-s-indacene-1-yl}]zirconium
(160) Dichloro[silacyclopentylene bis{2-(5-methyl-2-furyl)-4-phenyl-1,5,6,7-tetrahydro-s-indacene-1-yl}]zirconium
(161) Dimethylsilylene bis(indenyl)zirconium dichloride
(162) Dimethylsilylene bis(2-methyl-4,5-benzoindenyl) zirconium dichloride
(163) Dimethylsilylene bis(2-methyl-4-phenylindenyl) zirconium dichloride
(164) Dimethylsilylene bis(fluorenyl)zirconium dichloride
(165) Phenylmethylsilylene bis(indenyl)zirconium dichloride In addition, as the metallocene complex represented by the general formula (1), examples also include, but are not limited to, compounds such that the central metal M of the above-exemplified compounds is changed from a zirconium atom to a hafnium atom, and a compound such that one or each of $X^1$ and $X^2$ is changed from the chlorine atom exemplified above to a bromine atom, an iodine atom, a methyl group, a phenyl group, a dimethylamino group, a diethylamino group or the like. When each of these metallocene transition metal compounds contains an asymmetric carbon, unless otherwise noted, the compound represents one of the stereoisomers or a mixture thereof (including a racemic body), and it is preferably a racemic body.

The method for synthesizing the metallocene complex represented by the general formula (1) can be appropriately selected from conventionally-known synthesis methods. For example, the metallocene complex represented by the general formula (1) can be synthesized with reference to JP-A No. 2012-149160 or 2015-193605.

2. Component [B]

The component [B] used in the present invention is a solid component containing one or more selected from the group consisting of the following (b-1) to (b-3):

(b-1) a fine particulate carrier on which an ionic compound or Lewis acid which can convert the component [A] into a cation by reaction with the component [A] is supported, (b-2) solid acid fine particles, and (b-3) an ion-exchange layered compound.

In the present invention, the component [B] functions not only as a carrier supporting the component [A], but also as a co-catalyst in a polymerization reaction.

The (b-1) is a fine particulate carrier on which an ionic compound or Lewis acid which can convert the component [A] into a cation by reaction with the component [A] is supported.

As the ionic compound which can convert the component [A] into a cation by reaction with the component [A], examples include, but are not limited to, organic boron compounds such as (triphenylmethyl)tetrakis(pentafluorophenylborate), dimethylanilinium tetrakis(pentafluorophenylborate) and tetrakis(pentafluorophenylborate)ammonium salt.

As the Lewis acid which can convert the component [A] into a cation by reaction with the component [A], examples include, but are not limited to, various organic boron compounds such as tris(pentafluorophenyl)boron, metal halide compounds such as aluminum chloride and magnesium chloride, and methylaluminoxane. Some of the Lewis acids can be classified as the ionic compound which can convert the component [A] into a cation by reaction with the component [A]. Accordingly, the compounds belonging to both the Lewis acid and the ionic compound are regarded as belonging to any one of them.

The elemental composition and compound composition of the fine particulate carrier (b-1) are not particularly limited. As the fine particulate carrier (b-1), examples include, but are not limited to, a fine particulate carrier composed of an inorganic or organic compound. When the fine particulate carrier (b-1) is an inorganic carrier, the inorganic carrier may be silica, alumina, silica-alumina, magnesium chloride, activated carbon, inorganic silicate and so on, or the inorganic carrier may be a mixture thereof.

When the fine particulate carrier (b-1) is an organic carrier, the organic carrier may be fine particulate carrier of a porous polymer composed of a polymer of an α-olefin containing 2 to 14 carbon atoms, such as ethylene, propylene, 1-butene and 4-methyl-1-pentene, a polymer of an aromatic unsaturated hydrocarbon such as styrene and divinylbenzene, and so on, or the organic carrier may be a mixture thereof.

These fine particulate carriers generally have an average particle diameter of from 1 μm to 5 mm, preferably from 5 μm to 1 mm, and more preferably from 10 μm to 200 μm.

Methods of using a catalyst in which a cation-type metallocene compound, which is reacted with the above-described non-coordinating boron compound, is supported on an inorganic metal compound such as silica, are disclosed in JP-A Nos. H3-234709, H5-247128, H5-239138, H5-148316, H5-155926, H5-502906, H8-113604 and so on. Also, a method of using a catalyst in which methylaluminoxane is supported on an inorganic metal compound such as silica, is widely known.

The solid acid of the solid acid fine particles (b-2) may be a solid acid such as alumina, silica-alumina and zeolite.

The ion-exchange layered compound (b-3) accounts for the majority of clay minerals, and it is preferably an ion-exchange layered silicate.

Layered silicate is a silicate compound having a crystal structure such that planes formed by ion bonding or the like are stacked in parallel with each other by weak binding force.

In the natural environment, most layered silicate is mainly produced as a main component of cray minerals. The layered silicate used in the present invention is not limited to a natural product, and it may be an artificially synthesized product.

As the layered silicate, examples include, but are not limited to, known layered silicates described in "Nendo Kobutsugaku (Clay mineralogy)" written by Haruo Shirozu (published by Asakura Shoten in 1995), which include a kaolin group such as dickite, nacrite, kaolinite, anauxite, metahalloysite and halloysite, a serpentine group such as chrysotile, lizardite and antigorite, a smectite group such as montmorillonite, sauconite, beidellite, nontronite, saponite, tainiolite, hectorite and stevensite, a vermiculite group such as vermiculite, a mica group such as mica, illite, sericite and glauconite, attapulgite, sepiolite, palygorskite, bentonite, pyrophyllite, talc and a chlorite group. They may form a mixed layer.

Among them, a vermiculite group, a mica group and a smectite group such as montmorillonite, sauconite, beidellite, nontronite, saponite, hectorite, stevensite, bentonite and tainiolite, are preferred.

In general, a typical smectite group is montmorillonite, beidellite, saponite, nontronite, hectorite or sauconite, for example. Also, commercially-available products such as "BENCLAY SL" (manufactured by Mizusawa Industrial Chemicals, Ltd.), "KUNIPIA" and "SUMECTON" (both manufactured by Kunimine Industries Co., Ltd.), "MONT-MORILLONITE K10" (manufactured by Aldrich and Sued-Chemie) and "K-Catalysts Series" (manufactured by Sued-Chemie) can be used. A typical mica group is muscovite, paragonite, phlogopite, biotite or lepidolite, for example. Also, commercially-available products such as "SYNTHETIC MICA SOMASIF" (manufactured by Co-op Chemical Co., Ltd.) and fluorine phlogopite, fluorine tetrasilicon mica and tainiolite (all manufactured by Topy Industries, Ltd.) can be used. Among them, a smectite group such as "BENCLAY SL" is more preferred.

The layered silicate may be subjected to a chemical treatment. It is particularly preferable to chemically treat montmorillonite or a mineral containing montmorillonite as the main component, such as bentonite and activated clay, for use.

As the chemical treatment, examples include, but are not limited to, (a) a treatment with acid, (b) a treatment with alkali, (c) a treatment with salt and (d) a treatment with organic matter.

By these treatments, impurities are removed from the surface; cations are exchanged between the layers; and cations such as Al, Fe and Mg are dissolved out of the crystal structure. As a result, an ion complex, a molecular complex, an organic derivative or the like is formed, thereby changing surface area, interlayer distance, solid acidity and so on. These treatments may be used alone or in combination of two or more.

The (a) acid used in the chemical treatment may be an inorganic or organic acid. For example, the acid is preferably hydrochloric acid, sulfuric acid, nitric acid, acetic acid or oxalic acid. As the (b) alkali, examples include, but are not limited to, NaOH, KOH and NH3. The (c) salt is preferably a compound composed of a cation containing at least one kind of atom selected from the group consisting of the atoms of the Groups 2 to 14 in the periodic table and at least one kind of anion selected from the group consisting of anions derived from halogen atoms, inorganic acids and organic acids.

The (c) salt is more preferably a compound containing an ion derived from Li, Mg, Ca, Al, Ti, Zr, Hf, V, Nb, Ta, Cr, Mn, W, Mn, Fe, Co, Ni, Cu, Zn, B, Ge or Sn as a cation, or a compound containing an ion derived from Cl, $SO_4$, $NO_3$, OH, $C_2H_4$ or $PO_4$ as an anion. As the (d) organic matter, examples include an alcohol such as an aliphatic alcohol containing 1 to 4 carbon atoms (preferably methanol, ethanol, propanol, ethylene glycol, glycerol and the like) and an aromatic alcohol containing 6 to 8 carbon atoms (preferably phenol and the like), and a higher hydrocarbon containing 5 to 10 (preferably 5 to 8) carbon atoms (preferably hexane and heptane, for example). Also, formamide, hydrazine, dimethylsulfoxide, N-methylformamide, N,N-dimethylaniline and the like are preferred as the organic matter. The salt and the acid may be two or more kinds of salts and two or more kinds of acids.

In the case of combining the salt treatment and the acid treatment, they may be combined by any one of the following methods: the acid treatment is carried out after the salt treatment; the salt treatment is carried out after the acid treatment; and the salt treatment and the acid treatment are carried out at the same time. The salt and acid treatment conditions are not particularly limited. In general, it is preferred to perform the treatment so as to elute at least a part of the substances constituting the layered silicate by selecting the conditions of the concentration of the salt and acid of from 0.1 wt % to 50 wt %, the treatment temperature of from room temperature to boiling point, and the treatment time of from 5 minutes to 24 hours. The salt and the acid can be used in an organic solvent such as toluene, n-heptane and ethanol, or they may be used without a solvent when they are in the form of liquid at the treatment temperatures. The salt and the acid are preferably used in the form of aqueous solution.

The component [B] of the present invention can control particle properties by pulverization, granulation, sizing, classification and so on. They may be carried out by any methods, as long as the catalyst performance is not impaired.

As for the granulation method, examples include, but are not limited to, spray granulation, tumbling granulation, compression granulation, agitation granulation, briquetting, compacting, extrusion granulation, fluidized bed granulation, emulsion granulation and in-liquid granulation. Among these methods, spray granulation, tumbling granulation and compression granulation are preferred.

Among the above-described (b-1) to (b-3), the ion-exchange layered compound (b-3) is particularly preferred.

3. Component [C]

The component [C] is an alkyne compound represented by the following general formula (2):

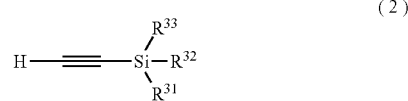

(2)

where each of $R^{31}$, $R^{32}$ and $R^{33}$ is independently a hydrogen atom, a hydrocarbon group containing 1 to 30 carbon atoms, a substituted silyl group being substituted with a hydrocarbon group containing 1 to 20 carbon atoms, a substituted germyl group being substituted with a hydrocarbon group containing 1 to 20 carbon atoms, a hydrocarbon group containing 1 to 30 carbon atoms and being substituted with the substituted silyl group, or a hydrocarbon group containing 1 to 30 carbon atoms and being substituted with the substituted germyl group.

As the hydrocarbon group containing 1 to 30 carbon atoms, as with the above, examples include, but are not limited to, a linear, branched or cyclic alkyl or alkenyl group and combinations thereof, an aryl group optionally being substituted with the alkyl or alkenyl group, and an alkyl or alkenyl group optionally being substituted with the aryl group.

The hydrocarbon group containing 1 to 30 carbon atoms is preferably a hydrocarbon group containing 1 to 20 carbon atoms, more preferably a hydrocarbon group containing 1 to 12 carbon atoms, and still more preferably a hydrocarbon group containing 1 to 6 carbon atoms.

As the hydrocarbon group, examples include, but are not limited to, those exemplified above as the hydrocarbon group of the component [A].

As the substituted silyl group being substituted with a hydrocarbon group containing 1 to 20 carbon atoms, examples include, but are not limited to, a —Si(R)$_3$ group (where each R is independently a hydrocarbon group containing 1 to 20 carbon atoms). As the substituted germyl group being substituted with a hydrocarbon group containing 1 to 20 carbon atoms, examples include, but are not limited to, a —Ge(R)$_3$ group (where each R is independently a hydrocarbon group containing 1 to 20 carbon atoms). The hydrocarbon group as the substituent may be the same as the above-described hydrocarbon group.

The hydrocarbon group in the hydrocarbon group containing 1 to 30 carbon atoms and being substituted with the substituted silyl group or in the hydrocarbon group containing 1 to 30 carbon atoms and being substituted with the substituted germyl group, may be the same as the above-described hydrocarbon group.

As $R^{31}$, $R^{32}$ and $R^{33}$, examples include, but are not limited to, an alkyl group such as methyl, ethyl, propyl, isopropyl, butyl, isobutyl, s-butyl, t-butyl, pentyl, neopentyl, hexyl, heptyl, octyl, nonyl, decyl, cyclopentyl and cyclohexyl, an aryl group such as phenyl, methylphenyl, ethylphenyl and naphthyl, an arylalkyl group such as benzyl and phenylethyl, an alkylsilyl group such as trimethylsilyl, triethylsilyl and tripropylsilyl, an arylsilyl group such as triphenylsilyl, diphenylmethylsilyl and phenyldimethylsilyl, an alkylgermyl group such as trimethylgermyl, triethylgermyl and tripropylgermyl, an arylgermyl group such as triphenylgermyl, diphenylmethylgermyl and phenyldimethylgermyl, an alkylsilyl group-substituted aryl group such as a 4-trimethylsilylphenyl group and a 3,5-bis(trimethylsilyl)phenyl group, an alkylgermyl group-substituted aryl group such as a 4-trimethylgermylphenyl group and a 3,5-bis(trimethylgermyl)phenyl group, and a hydrogen atom.

In the general formula (2), it is preferable that at least one of $R^{31}$, $R^{32}$ and $R^{33}$ is a hydrocarbon group containing 1 to 30 carbon atoms, a substituted silyl group being substituted with a hydrocarbon group containing 1 to 20 carbon atoms, a substituted germyl group being substituted with a hydrocarbon group containing 1 to 20 carbon atoms, a hydrocarbon group containing 1 to 30 carbon atoms and being substituted with the substituted silyl group, or a hydrocarbon group containing 1 to 30 carbon atoms and being substituted with the substituted germyl group; it is more preferable that at least one of $R^{31}$, $R^{32}$ and $R^{33}$ is a hydrocarbon group containing 2 or more carbon atoms; and it is still more preferable that at least one of $R^{31}$, $R^{32}$ and $R^{33}$ is an alkyl group containing 2 or more carbon atoms.

Meanwhile, when the steric hindrance is too large, there is a possibility that an interaction between the alkyne compound and the catalytic active species is too weak. Accordingly, it is preferable that none or one of $R^{31}$, $R^{32}$ and $R^{33}$ is a substituent such that the total number of the carbon atoms of the whole substituent, which includes the number of the carbon atoms of the substituted group, is 3 or more. It is more preferable that one of $R^{31}$, $R^{32}$ and $R^{33}$ is such a substituent.

From the viewpoint of the interaction between the alkyne compound and the catalytic active species, the upper limit of the carbon number of the substituent is preferably 12 or less, and more preferably 9 or less.

At least one of $R^{31}$, $R^{32}$ and $R^{33}$ may be a hydrocarbon group containing 1 to 9 carbon atoms; at least two of $R^{31}$, $R^{32}$ and $R^{33}$ may be each a hydrocarbon group containing 1 to 9 carbon atoms; and all of $R^{31}$, $R^{32}$ and $R^{33}$ may be each a hydrocarbon group containing 1 to 9 carbon atoms. Also, one of $R^{31}$, $R^{32}$ and $R^{33}$ may be a hydrocarbon group containing 1 to 9 carbon atoms, and the remaining two may be each a hydrocarbon group containing 1 or 2 carbon atoms.

As the alkyne compound represented by the formula (2), examples include, but are not limited to, the following:

methylsilylacetylene, dimethylsilylacetylene, trimethylsilylacetylene, ethylsilylacetylene, diethylsilylacetylene, triethylsilylacetylene, ethyldimethylsilylacetylene, diethylmethylsilylacetylene, n-propylsilylacetylene, n-propylmethylsilylacetylene, n-propyldimethylsilylacetylene, n-propylethylmethylsilylacetylene, n-propylethylsilylacetylene, n-propyldiethylsilylacetylene, i-propylsilylacetylene, i-propylmethylsilylacetylene, i-propyldimethylsilylacetylene, ethyl-i-propylmethylsilylacetylene, ethyl-i-propylsilylacetylene, diethyl-i-propylsilylacetylene, n-butylsilylacetylene, n-butylmethylsilylacetylene, n-butyldimethylsilylacetylene, n-butylethylmethylsilylacetylene, n-butylethylsilylacetylene, n-butyldiethylsilylacetylene, i-butylsilylacetylene, i-butylmethylsilylacetylene, i-butyldimethylsilylacetylene, i-butylethylmethylsilylacetylene, i-butylethylsilylacetylene, i-butyldiethylsilylacetylene, s-butylsilylacetylene, s-butylmethylsilylacetylene, s-butyldimethylsilylacetylene, s-butylethylmethylsilylacetylene, s-butylethylsilylacetylene, s-butyldiethylsilylacetylene, t-butylsilylacetylene, t-butylmethylsilylacetylene, t-butyldimethylsilylacetylene, t-butylethylmethylsilylacetylene, t-butylethylsilylacetylene, t-butyldiethylsilylacetylene and dimethylphenylsilylacetylene;

methyl(trimethylsilyl)silylacetylene, dimethyl(trimethylsilyl)silylacetylene and ethylmethyl(trimethylsilyl)silylacetylene;

dimethyl(4-trimethylsilylphenyl)silylacetylene and methyl(3,5-bis(trimethylsilyl)phenyl)silylacetylene; and dimethyl(trimethylgermyl)silylacetylene and dimethyl(4-trimethylgermylphenyl)silylacetylene.

4. Component [D]

It is preferable that the olefin polymerization catalyst of the present invention further contains the following component [D]:

the component [D]: an organoaluminum compound.

The organoaluminum compound is a compound which serves as a hydrocarbonizing agent when the halide of a transition metal compound is used as the component [A]; moreover, it is a compound which serves as a scavenger of impurities brought by a solvent or monomer introduced in the system. Accordingly, it is preferable to use a compound in which at least one hydrocarbon group is directly bound to aluminum.

For example, a preferable organoaluminum compound is a compound represented by the following general formula (3):

$$AlR^{41}_j X_{3-j} \quad (3)$$

where $R^{41}$ is a hydrocarbon group containing 1 to 20 carbon atoms; X is a hydrogen atom, a halogen atom or an alkoxy group; and j is a number satisfying $0 < j \leq 3$.

$R^{41}$ is a hydrocarbon group containing 1 to 20 carbon atoms. $R^{41}$ is preferably an alkyl, alkenyl, aryl or aralkyl group containing 1 to 12 carbon atoms, for example.

From the viewpoint of serving as a good co-catalyst, j in the general formula (3) is preferably 3, and the organoaluminum compound is preferably a compound represented by the following general formula (3'): $Al(R_{41})_3$ (where $R^{41}$ is a hydrocarbon group containing 1 to 20 carbon atoms.)

More specifically, trialkylaluminum such as trimethylaluminum, triethylaluminum, tri-n-propylaluminum, tri-isobutylaluminum and tri-n-octylaluminum, dialkylaluminum monohalide such as diethylaluminum chloride, dibutylaluminum chloride and dioctylaluminum chloride, and dialkylaluminum monoalkoxide such as diethylaluminum methoxide are preferably used. Among them, trialkylaluminum and dialkylaluminum monohalide are more preferred, and trialkylaluminum is particularly preferred.

These organoaluminum compounds may be used in combination of two or more kinds. They may be modified by use of alcohol, phenol or the like for use. As the modifier, examples include, but are not limited to, methanol, ethanol, 1-propanol, isopropanol, butanol, phenol, 2,6-dimethylphenol and 2,6-di-t-butylphenol. Among them, 2,6-dimethylphenol and 2,6-di-t-butylphenol are preferred.

5. Amounts of the Contained Components

The amount of the contained component [A] is preferably from 0.001 mmol to 100 mmol per gram (g) of the component [B], more preferably from 0.005 mmol to 1 mmol, and still more preferably from 0.01 mmol to 0.1 mmol.

The amount of the contained component [C] is preferably from 0.001 mmol to 1000 mmol per gram (g) of the component [B], more preferably from 0.005 mmol to 5.0 mmol, and still more preferably from 0.01 mmol to 1.0 mmol.

The molar ratio of the transition metal atoms in the component [A] to the component [C] (the transition metal atoms (mol) in the component [A]: the component [C] (mol)) is preferably from 1:0.001 to 1:1,000, more preferably from 1:0.1 to 1:100, and still more preferably from 1:1 to 1:50.

When the component [D] is contained, the amount of the contained component [D] is preferably from 0.01 mmol to 10,000 mmol per gram (g) of the component [B], and more preferably from 0.1 mmol to 500 mmol.

The molar ratio of the transition metal atoms in the component [A] to the aluminum atoms in the component [D] (the transition metal atoms (mol) in the component [A]: the aluminum atoms (mol) in the component [D]) is preferably from 1:0.01 to 1:100,000, more preferably from 1:0.1 to 1:30,000, still more preferably from 1:1 to 1:1,000, even more preferably from 1:2 to 1:500, and particularly preferably from 1:2 to 1:100.

The molar ratio of the component [C] to the aluminum atoms in the component [D] (the component [C] (mol): the aluminum atoms (mol) in the component [D]) is preferably from 1:0.1 to 1:20,000, more preferably from 1:0.5 to 1:10,000, still more preferably from 1:1 to 1:1,000, even more preferably from 1:1 to 1:100, and particularly preferably from 1:1 to 1:50.

These usage ratios are merely normal ratio examples. As long as the catalyst does not depart from the function of the present invention, the present invention is not limited by the above-described usage ratio ranges.

The olefin polymerization catalyst production method of the present invention is not particularly limited, as long as the olefin polymerization catalyst containing the components [A], [B] and [C] can be produced. For example, the olefin polymerization catalyst can be produced by the olefin polymerization catalyst production method of the present invention described below.

II. Olefin Polymerization Catalyst Production Method

The olefin polymerization catalyst production method of the present invention is an olefin polymerization catalyst production method wherein an olefin polymerization catalyst is produced by mixing the components [A], [B] and [C].

The order of mixing the components [A], [B] and [C] is not particularly limited. As the mixing order, examples include the following orders. The term "mix" may be understood as the term "bring into contact".

(1) The components [B] and [C] are mixed, and then the component [A] is mixed with the mixture.

(2) The components [A] and [C] are mixed, and then the component [B] is mixed with the mixture.

(3) The components [A] and [B] are mixed, and then the component [C] is mixed with the mixture.

(4) The components [A], [B] and [C] are mixed at the same time.

In the case of further mixing the component [D], as the mixing order, examples include the following orders.

(5) The components [B], [C] and [D] are mixed, and then the component [A] is mixed with the mixture.

(6) The components [A], [B] and [C] are mixed, and then the component [D] is mixed with the mixture.

(7) The components [B] and [D] are mixed; the components [A] and [C] are mixed; then, the mixtures are mixed.

(8) The components [A] and [B] are mixed; the components [C] and [D] are mixed; and then the mixtures are mixed.

(9) The components [B] and [C] are mixed; the components [A] and [D] are mixed; and then the mixtures are mixed.

From the viewpoint of high catalyst activation, the method in which the components [B] and [C] are mixed, and then the component [A] is mixed with the mixture, is preferred, and any one of the above-described (1), (5) and (9) is preferred.

The mixing condition is not particularly limited. These compounds may be directly mixed, or they may be mixed by use of a solvent. From the viewpoint of uniformly mixing them, it is preferable to use a solvent.

Also, different kinds of components may be used as a mixture in each component, or they may be separately mixed in a different order. This mixing may be carried out not only at the time of catalyst preparation, but also at the time of preliminary polymerization by use of an olefin or at the time of olefin polymerization.

Any component may be split and brought into contact with other components as follows, for example: the components [B] and [C] are mixed, and then a mixture of the components [A] and [C] is added to the mixture of the components [B] and [C]. Also, known processes such as washing and purification may be carried out as follows, for example: the components [B] and [D] are mixed; the mixture is washed by, for example, replacing the solvent; and then the component [D] is added again to the mixture, followed by mixing them.

The mixing of the components [A], [B] and [C] or the bringing of the components into contact with each other, is preferably carried out in an inert gas such as nitrogen and in an inert hydrocarbon solvent such as pentane, hexane, heptane, decane, mineral oil, toluene and xylene. From the viewpoint of safety and hygiene, saturated hydrocarbon is particularly preferred. The mixing of the components or the bringing of the components into contact with each other, can be carried out at a temperature between −20° C. and the boiling point of the solvent, and it is particularly preferably carried out at a temperature between 20° C. and the boiling point of the solvent.

The amount of the component [A] used is preferably from 0.001 mmol to 100 mmol per gram (g) of the component [B], more preferably from 0.005 mmol to 1 mmol, and still more preferably from 0.01 mmol to 0.1 mmol.

The amount of the component [C] used is preferably from 0.001 mmol to 1000 mmol per gram (g) of the component [B], more preferably from 0.005 mmol to 5.0 mmol, and still more preferably from 0.01 mmol to 1.0 mmol.

The molar ratio of the transition metal atoms in the component [A] to the component [C] (the transition metal atoms (mol) in the component [A]: the component [C] (mol)) is preferably from 1:0.001 to 1:1,000, more preferably from 1:0.1 to 1:100, and still more preferably from 1:1 to 1:50.

When the component [D] is further added, the amount of the component [D] used is preferably from 0.01 mmol to 10,000 mmol per gram (g) of the component [B], and more preferably from 0.1 mmol to 500 mmol.

The molar ratio of the transition metal atoms in the component [A] to the aluminum atoms in the component [D] (the transition metal atoms (mol) in the component [A]: the aluminum atoms (mol) in the component [D]) is preferably from 1:0.01 to 1:100,000, more preferably from 1:0.1 to 1:30,000, still more preferably from 1:1 to 1:1,000, even more preferably from 1:2 to 1:500, and particularly preferably from 1:2 to 1:100.

The molar ratio of the component [C] to the aluminum atoms in the component [D] (the component [C] (mol): the aluminum atoms (mol) in the component [D]) is preferably from 1:0.1 to 1:20,000, more preferably from 1:0.5 to 1:10,000, still more preferably from 1:1 to 1:1,000, even more preferably from 1:1 to 1:100, and particularly preferably from 1:1 to 1:50.

Before the catalyst produced by mixing the components [A], [B] and [C] is used as an olefin polymerization (main polymerization) catalyst, a small amount of olefin such as ethylene, propylene, 1-butene, 1-hexene, 1-octene, 4-methyl-1-pentene, 3-methyl-1-butene, vinylcycloalkane and styrene may be preliminarily polymerized (preliminary polymerization). Preliminary polymerization is known to be effective in preventing lump formation and fouling, which are due to poor removal of reaction heat that is seen in the early stage of polymerization. The reaction temperature and time of the preliminary polymerization can be controlled independently of the polymerization reaction condition. Accordingly, the preliminary polymerization is preferred since it is effective in preventing powdery polymer formation, which is due to particle fragmentation, while promoting active site formation.

The preliminary polymerization by use of ethylene or the like, can be carried out before, during or after any process of the catalyst production, as long as the effect of the preliminary polymerization is not impaired. The preliminarily polymerization is preferably carried out in an inert solvent or in the absence of solvent (when a liquid α-olefin is used, the preliminary polymerization may be carried out in the α-olefin) by newly adding organic aluminum (such as the component [D]) as needed and supplying ethylene, propylene or the like to the components being in contact with each other so that a polymer is produced in an amount of 0.01 g to 1,000 g (preferably 0.1 g to 100 g) per gram (g) of the catalyst component. The preliminary polymerization temperature is from −100° C. to 100° C., and preferably from −60° C. to 100° C. The preliminary polymerization time is from 0.1 hour to 100 hours, and preferably from 0.1 hour to 20 hours.

III. Olefin Polymer Production Method

The olefin polymer production method of the present invention is an olefin polymer production method, wherein an olefin is polymerized or copolymerized in the presence of the olefin polymerization catalyst of the present invention or in the presence of an olefin polymerization catalyst obtained by the olefin polymerization catalyst production method of the present invention.

As the olefin that is polymerizable by the olefin polymerization catalyst of the present invention, examples include, but are not limited to, ethylene, propylene, 1-butene, 3-methyl-1-butene, 3-methyl-1-pentene, 4-methyl-1-pentene, vinylcycloalkane and a conjugated diene (such as butadiene), a non-conjugated diene (such as 1,5-hexadiene), styrene and derivatives thereof. The polymerization may be homopolymerization or generally-known copolymerization such as random copolymerization and block copolymerization. As the polymerization, examples include, but are not limited to, propylene polymerization and copolymerization of propylene and α-olefin.

The polymerization reaction is preferably carried out in the presence of a solvent such as inert hydrocarbon (e.g., butane, pentane, hexane, heptane, toluene, cyclohexane) and liquefied α-olefin (a monomer), or by gas phase polymerization in the substantial absence of a solvent or of the liquid phase of a monomer. The gas phase polymerization can be carried out by use of a reactor such as a fluidized bed, a stirred bed and a stirred fluidized bed equipped with a stirring and mixing machine.

The polymerization conditions such as polymerization temperature and polymerization pressure are not particularly limited. The polymerization temperature is generally from −50° C. to 250° C., and preferably from 0° C. to 100° C. The polymerization pressure is in a range of generally from normal pressure to about 2,000 kgf/cm$^2$, preferably from normal pressure to 200 kgf/cm$^2$, and more preferably from normal pressure to 50 kgf/cm$^2$. Also, hydrogen may be present in the polymerization system. Hydrogen has the function of controlling the molecular weight of a polymer; moreover, it has the effect of increasing catalytic activity. Accordingly, one preferred embodiment is that hydrogen is added to and coexists in the polymerization system.

EXAMPLES

Hereinafter, the present invention will be further described in more detail by the following examples and comparative examples. The present invention is not limited to the following examples and comparative examples, however.

[Evaluation Method]

Melt flow rate (MFR)

The melt flow rate was measured according to "Testing Methods for Polypropylenes" defined in JIS-K-6758 (testing conditions: 230° C. and a load of 2.16 kgf).

Example 1

(1) Preparation of Catalyst

[Synthesis of the Component (A) (Metallocene Complex)]

Dichlorosilacyclobutylene bis[2-(5-methyl-2-furyl)-4-(4-t-butylphenyl)-5,6-dimethyl-1-indenyl]zirconium (complex 1) was synthesized with reference to the method for synthesizing the complex G of Example 7 described in paragraph 0160 of JP-A No. 2015-193605.

[Chemical Treatment of the Component (B) (Layered Silicate)]

In the same manner as Example 3 described in JP-A No. 2019-172958, chemically-treated, dried ion-exchange layered silicate particles (acid- and Li salt-treated montmorillonite) were produced. As a result of analysis of the obtained layered silicate, it was found that Al/Si (molar ratio)=0.176.

[Preparation of Solid Catalyst and Preliminary Polymerization by Use of Propylene]

First, 15 g of the chemically-treated ion-exchange layered silicate particles obtained above and 54 mL of heptane were introduced to a 1 L three-necked flask equipped with a stirrer. After a carrier slurry was prepared, 96 mL of heptane solution of tri-n-octylaluminum (TNOA) (0.392 M) was added thereto. While keeping room temperature, they were stirred for one hour. Then, at room temperature, the solid matter of the slurry was washed with heptane. Finally, the amount of the slurry was adjusted to 75 mL.

Next, 114 mL of heptane was introduced to the carrier slurry. Then, the temperature of the system was increased to 40° C. Then, 46.5 mL of heptane solution of TNOA (0.392 M) and 19 mL of heptane solution of trimethylsilylacetylene (0.356 M) were added thereto with stirring the slurry, and the stirring was continued for 10 minutes with keeping the temperature inside the system at 40° C. Then, the slurry was transferred to and stirred in a stirring autoclave (inner volume 1 L). When the temperature inside the autoclave was stable at 40° C., a complex slurry, which was preliminarily prepared by adding 282 mg of the complex 1 to 45 mL of heptane, was added to the carrier slurry, and they were continuously stirred for 60 minutes with keeping the temperature inside the system at 40° C. Then, with continuing the stirring, propylene was supplied for two hours at a rate of 15 g/hr. After the propylene supply was completed, while keeping the temperature inside the system at 40° C., a reaction was continued until the pressure inside the autoclave reached 0.045 MPaG. After gas remaining in the autoclave was purged and replaced with nitrogen, a catalyst slurry thus produced was transferred from the autoclave to a 1 L three-necked flask. Then, the recovered catalyst slurry was left to stand, and a supernatant was removed therefrom. To a solid component that was left, 3.2 mL of heptane solution of triisobutylaluminum (0.73 M) was added at room temperature, and they were stirred for 10 minutes. After the temperature of the mixture was increased to 40° C. in an oil bath, the mixture was dried under reduced pressure, thereby recovering 31.7 g of a preliminarily polymerized catalyst.

(2) Propylene Polymerization

After sufficiently replacing the inside of a stirring autoclave (inner volume 3 L) with propylene, at room temperature, 2.8 mL of heptane solution of triisobutylaluminum (2.02 M) was added. In addition, 451 mL of hydrogen and then 750 g of liquid propylene were introduced. The temperature of the autoclave was increased to 65° C. While keeping the temperature of the autoclave at 65° C., a normal-heptane slurry of the preliminarily polymerized catalyst obtained above was injected by use of argon, and polymerization was carried out at 65° C. for one hour. Into the autoclave, 5 mL of ethanol was injected by use of argon, and then the remaining gas was purged. A polymer thus obtained was dried at 90° C. for one hour. As a result, 310 g of a polymer was obtained. The solid catalyst preparation conditions of Example 1 are shown in Table 1, and the polymerization results of Example 1 are shown in Table 2.

Example 2

(1) Preparation of Catalyst

Preparation of a solid catalyst and preliminary polymerization were carried out in the same manner as Example 1, except the following: in [Preparation of solid catalyst and preliminary polymerization by use of propylene], the amount of the heptane added to the carrier slurry was changed to 121 mL, and 12 mL of heptane solution of triethylsilylacetylene (0.556 M) was used in place of the heptane solution of trimethylsilylacetylene.

(2) Propylene Polymerization

Propylene polymerization was carried out in the same manner as Example 1, except that the preliminarily polymerized catalyst obtained in the above (1) was used.

The solid catalyst preparation conditions of Example 2 are shown in Table 1, and the polymerization results of Example 2 are shown in Table 2.

Example 3

(1) Preparation of Catalyst

Preparation of a solid catalyst and preliminary polymerization were carried out in the same manner as Example 1, except the following: in [Preparation of solid catalyst and preliminary polymerization by use of propylene], the amount of the complex 1 was changed to 283 mg; the amount of the heptane added to the carrier slurry was changed to 117 mL; and 17 mL of heptane solution of t-butyldimethylsilylacetylene (0.412 M) was used in place of the heptane solution of trimethylsilylacetylene.

(2) Propylene Polymerization

Propylene polymerization was carried out in the same manner in Example 1, except that the preliminarily polymerized catalyst obtained in the above (1) was used, and the hydrogen amount was changed to 440 mL. The solid catalyst preparation conditions of Example 3 are shown in Table 1, and the polymerization results of Example 3 are shown in Table 2.

Comparative Example 1

(1) Preparation of Catalyst

Preparation of a solid catalyst and preliminary polymerization were carried out in the same manner as Example 1, except the following: in [Preparation of solid catalyst and preliminary polymerization by use of propylene], the amount of the heptane added to the carrier slurry was changed to 134 mL, and trimethylsilylacetylene was not added.

(2) Propylene Polymerization

Propylene polymerization was carried out in the same manner as Example 1, except that the preliminarily polymerized catalyst obtained in the above (1) was used, and the hydrogen amount was changed to 660 mL. The solid catalyst preparation conditions of Comparative Example 1 are shown in Table 1, and the polymerization results of Comparative Example 1 are shown in Table 2.

Comparative Example 2

(1) Preparation of Catalyst

Preparation of a solid catalyst and preliminary polymerization were carried out in the same manner as Example 1, except the following: in [Preparation of solid catalyst and preliminary polymerization by use of propylene], the amount of the heptane added to the carrier slurry was changed to 113 mL, and 21 mL of heptane solution of bis(trimethylsilyl)acetylene (0.330 M) was used in place of the heptane solution of trimethylsilylacetylene.

(2) Propylene Polymerization

Propylene polymerization was carried out in the same manner as Example 1, except that the preliminarily polymerized catalyst obtained in the above (1) was used. The solid catalyst preparation conditions of Comparative Example 2 are shown in Table 1, and the polymerization results of Comparative Example 2 are shown in Table 2.

Comparative Example 3

(1) Preparation of Catalyst

Preparation of a solid catalyst and preliminary polymerization were carried out in the same manner as Example 1, except the following: in [Preparation of solid catalyst and preliminary polymerization by use of propylene], the amount of the heptane added to the carrier slurry was changed to 147 mL; the amount of the heptane solution of TNOA (0.392 M) was changed to 31.0 mL; 1.8 mL of heptane solution of vinyltrimethylsilane (0.506 M) was used in place of the heptane solution of trimethylsilylacetylene; the amount of the complex 1 was changed to 284 mg; and the complex slurry and the carrier slurry were stirred for 45 minutes.

(2) Propylene Polymerization

Propylene polymerization was carried out in the same manner as Example 1, except that the preliminarily polymerized catalyst obtained in the above (1) was used. The solid catalyst preparation conditions of Comparative Example 3 are shown in Table 1, and the polymerization results of Comparative Example 3 are shown in Table 2.

Example 4

(1) Preparation of Catalyst

Preparation of a solid catalyst and preliminary polymerization were carried out in the same manner as Example 1, except the following: in [Preparation of solid catalyst and preliminary polymerization by use of propylene], the amount of the complex 1 was changed to 285 mg, and the complex slurry and the carrier slurry were stirred for 120 minutes.

(2) Propylene Polymerization

Propylene polymerization was carried out in the same manner as Example 1, except that the preliminarily polymerized catalyst obtained in the above (1) was used, and the hydrogen amount was changed to 352 mL. The solid catalyst preparation conditions of Example 4 are shown in Table 1, and the polymerization results of Example 4 are shown in Table 2.

Comparative Example 4

(1) Preparation of Catalyst

Preparation of a solid catalyst and preliminary polymerization were carried out in the same manner as Example 4, except the following: in [Preparation of solid catalyst and preliminary polymerization by use of propylene], the amount of the complex 1 was changed to 284 mg, and trimethylsilylacetylene was not added.

(2) Propylene Polymerization

Propylene polymerization was carried out in the same manner as Example 1, except that the preliminarily polymerized catalyst obtained in the above (1) was used, and the hydrogen amount was changed to 473 mL. The solid catalyst preparation conditions of Comparative Example 4 are shown in Table 1, and the polymerization results of Comparative Example 4 are shown in Table 2.

TABLE 1

| | Catalyst component | | | | | | | | | | Complex-Carrier | Preliminary polymerization |
|---|---|---|---|---|---|---|---|---|---|---|---|---|
| | Component [A] | Amount (mg) | Component [B] | Amount (g) | Component [C] | Amount (mmol) | [C]/[A] Molar ratio | [C]/[B] (μmol/g) | Component [D] | Amount (mmol) | Stirring time (min) | PY (g-PPig-Catalyst) |
| Example 1 | Complex 1 | 282 | Acid- and Li salt-treated montmoritionite | 16 | Trimethylsilyl-acetylene | 6.8 | 22.7 | 463 | TNOA | 18.2 | 60 | 1.07 |
| Example 2 | Complex 1 | 282 | Acid- and Li salt-treated montmoritionite | 16 | Triethylsilyl-acetylene | 6.7 | 22.4 | 447 | TNOA | 18.2 | 60 | 1.08 |
| Example 3 | Complex 1 | 283 | Acid- and Li salt-treated montmoritionite | 16 | t-Butyldimethyl-silylacetylene | 7.0 | 23.3 | 467 | TNOA | 18.2 | 60 | 1.06 |
| Example 4 | Complex 1 | 286 | Acid- and Li salt-treated montmoritionite | 16 | Triethylsilyl-acetylene | 6.8 | 22.5 | 463 | TNOA | 18.2 | 120 | 1.06 |
| Comparative Example 1 | Complex 1 | 282 | Acid- and Li salt-treated montmoritionite | 16 | None | 0 | 2.0 | 0 | TNOA | 18.2 | 60 | 1.02 |
| Comparative Example 2 | Complex 1 | 282 | Acid- and Li salt-treated montmoritionite | 16 | Bis(trimethylsilyl)acetylene | 6.9 | 23.0 | 460 | TNOA | 18.2 | 60 | 1.12 |
| Comparative Example 3 | Complex 1 | 284 | Acid- and Li salt-treated montmoritionite | 16 | Vinyl-trimethyl-silane | 0.91 | 3.02 | 61 | TNOA | 18.2 | 45 | 1.01 |
| Comparative Example 4 | Complex 1 | 284 | Acid- and Li salt-treated montmoritionite | 16 | None | 0 | 0.0 | 0 | TNOA | 18.2 | 120 | 1.04 |

TABLE 2

| | Polymerization results | | | | |
|---|---|---|---|---|---|
| | Catalyst amount (mg) | Yield (g) | Activity g-PP/g-catalyst/hr | Activity ratio | MFR (g/10 min) |
| Example 1 | 18.6 | 310 | 16,700 | 1.20 | 133 |
| Example 2 | 14.0 | 271 | 19,400 | 1.40 | 29.6 |
| Example 3 | 13.6 | 299 | 22,000 | 1.58 | 15.3 |
| Example 4 | 14.6 | 252 | 17,300 | 1.24 | 11.5 |
| Comparative Example 1 | 16.8 | 234 | 13,900 | 1.00 | 115 |
| Comparative Example 2 | 16.5 | 196 | 11,900 | 0.86 | 28.4 |
| Comparative Example 3 | 19.4 | 206 | 10,600 | 0.76 | 19.6 |
| Comparative Example 4 | 17.2 | 190 | 11,000 | 0.79 | 44.0 |

Example 5

(1) Preparation of Catalyst
[Synthesis of Component (A) (Metallocene Complex)]

First, rac-dichloro[1,1'-dimethylsilylene bis{2-(5-methyl-2-furyl)-4-(4-i-propylphenyl)-1-indenyl}]hafnium (complex 2) was synthesized by the method of Synthesis Example 1 described in JP-A No. 2012-149160.

[Chemical Treatment of Component (B) (Layered Silicate)]

First, "BENCLAY KK" manufactured by Mizusawa Industrial Chemicals, Ltd., which contains montmorillonite (of a smectite group having a 2:1 type layer structure) as the main component, was used and treated in the same manner as Comparative Example 1-2C described in International Publication No. WO2020/203274, thereby obtaining chemically-treated, dried ion-exchange layered silicate particles. As a result of analysis of the obtained ion-exchange layered silicate particles, it was found that Al/Si (molar ratio)=0.218.

[Preparation of Solid Catalyst and Preliminary Polymerization by Use of Propylene]

First, 10 g of the chemically-treated, dried ion-exchange layered silicate particles obtained above and 66 mL of heptane were introduced to a 1 L three-necked flask equipped with a stirrer. After a slurry was prepared, 34.5 mL of heptane solution of triisobutylaluminum (TiBA) (0.721 M) was added thereto. While keeling room temperature, they were stirred for one hour. Then, the solid matter of the slurry was washed with heptane. Finally, the amount of the slurry was adjusted to 50 mL.

Next, after the slurry was heated to 50° C., 5.5 mL of heptane solution of TiBA (0.721 M) and 0.896 g of heptane solution of t-butyldimethylsilylacetylene (22.5 wt %) were added thereto. They were stirred for 5 minutes with keeping the temperature inside the system at 50° C. Next, 30 ml of toluene solution of the complex 2 (144 mg) was added thereto, and they were stirred for 20 minutes with keeping the temperature inside the system at 50° C. The heating was stopped, and 210 ml of heptane was added. Then, the slurry was transferred to and stirred in a stirring autoclave (inner volume 1 L). When the temperature inside the autoclave was stable at 40° C., propylene was supplied for two hours at a rate of 10 g/hr. After the propylene supply was completed, while keeping the temperature inside the autoclave at 40° C., the stirring of the slurry was continued until the pressure inside the autoclave decreased to 0.025 MPaG. After remaining gas was purged and replaced with nitrogen, the catalyst slurry was recovered and transferred from the autoclave to a 1 L three-necked flask. Then, the recovered catalyst slurry was left to stand; a supernatant was removed therefrom; and then a residue thus obtained washed with heptane. To a solid component that was left, 8.5 mL of heptane solution of triisobutylaluminum (0.721 M) was added at room temperature, and they were stirred for 10 minutes. After the temperature of the mixture was increased to 40° C. in an oil bath, the mixture was dried under reduced pressure, thereby recovering 29.5 g of a preliminarily polymerized catalyst.

The molar ratio of the component (C) to the component (A) was as follows: [C]/[A]=9.6. The molar amount of the component (B) per gram of the component (C) was 0.141 mmol/g.

(2) Propylene Polymerization

After sufficiently replacing the inside of a stirring autoclave (inner volume 3 L) with propylene, at room temperature, 2.8 mL of heptane solution of triisobutylaluminum (2.02 M) was added. In addition, 45 ml of hydrogen and 750 g of liquid propylene were introduced. The temperature inside the tank of the autoclave was increased to 70° C. While keeping the temperature inside the tank at 70° C., as a heptane slurry, 45 mg of the preliminarily polymerized catalyst obtained above (excluding the weight of the preliminarily polymerized polymer) was injected by use of argon, and polymerization was carried out at 70° C. for one hour. After the polymerization for one hour, 5 mL of ethanol was injected into the autoclave by use of argon to purge remaining gas. A polymer thus obtained was dried at 90° C. for one hour. As a result, 222 g of a polymer was obtained. The polymerization conditions and results of Example 5 are shown in Table 3.

Example 6

Using the preliminarily polymerized catalyst obtained in the above (1), propylene polymerization was carried out in the same manner as Example 5, except for the catalyst and hydrogen amounts shown in Table 3. The polymerization results of Example 6 are shown in Table 3.

Comparative Example 5

(1) Preparation of Catalyst

Preparation of a solid catalyst and preliminary polymerization were carried out in the same manner as Example 5, except the following: in [Preparation of solid catalyst and preliminary polymerization by use of propylene], the heptane solution of t-butyldimethylsilylacetylene was not added.

(2) Propylene Polymerization

Using the preliminarily polymerized catalyst obtained in the above (1), propylene polymerization was carried out in the same manner as Example 5, except for the catalyst and hydrogen amounts shown in Table 3. The polymerization results of Comparative Example 5 are shown in Table 3.

Comparative Example 6

Using the preliminarily polymerized catalyst obtained in Comparative Example 5, propylene polymerization was carried out in the same manner as Example 5, except for the catalyst and hydrogen amounts shown in Table 3. The polymerization results of Comparative Example 6 are shown in Table 3.

TABLE 3

| | Catalyst amount (mg) | Hydrogen amount (ml) | Polymer yield (g) | Polymerization activity (g-PP/g-cat) | MFR (g/10 min) |
|---|---|---|---|---|---|
| Example 5 | 45 | 45 | 222 | 4900 | 37 |
| Example 6 | 30 | 72 | 195 | 6400 | 54 |
| Comparative Example 5 | 43 | 44 | 153 | 3600 | 35 |
| Comparative Example 6 | 31 | 69 | 144 | 4700 | 41 |

FIG. 1 shows a graph plotting, for Examples 5 and 6 and Comparative Examples 5 and 6, the polymerization activity of a catalyst with respect to the amount of added hydrogen.

Discussion

Comparative Examples 2 and 3 are examples disclosed in Patent Document 2, in each of which bistrimethylsilylacetylene or trimethylvinylsilane was added. As a result of the application of bistrimethylsilylacetylene or trimethylvinylsilane to the metallocene complex specified in the present invention, catalytic activity rather deteriorated compared to Comparative Example 1 in which nothing was added.

In the examples of the present invention, as a result of the application of the specific silylacetylene compounds to the metallocene complex specified in the present invention, excellent polymerization activity was achieved compared to Comparative Example 1 in which nothing was added.

A comparison between Comparative Examples 1 and 4 shows that when nothing is added, the activity decreases in the case where the time of contact between the components during the catalyst preparation is long (Comparative Example 4), as compared with the case where the time of contact between the components is short (Comparative Example 1). Meanwhile, a comparison between Examples 1 and 4 shows the following: when the specific silylacetylene compound is applied, a decrease in catalyst performance does not occur (the activity ratio of Example 1 and that of Example 4 are equivalent) even when the time of contact between the components during the catalyst preparation is long; therefore, the catalyst of the present invention is less susceptible to the influence of a change in the reaction conditions during the catalyst preparation. That is, the results of Example 4 and Comparative Example 4 demonstrate the effect of enhancing the catalyst stability by the present invention. This is very preferable for catalyst production on industrial scale in industrial facilities.

Also, a comparison between Examples 5 and 6 and Comparative Examples 5 and 6 shows that even in the case of the catalyst in which the metallocene complex containing hafnium as the central metal is used, the polymerization activity is significantly increased by the application of the specific silylacetylene compound (FIG. 1).

Accordingly, as described above, the rationality of the present invention and its excellence over the prior art are demonstrated.

INDUSTRIAL APPLICABILITY

According to the olefin polymerization catalyst and olefin polymer production method of the present invention, an olefin can be polymerized with high activity by the catalyst having improved stability, and an olefin polymer can be produced with high production efficiency. The olefin polymerization catalyst and olefin polymer production method of the present invention are very useful for catalyst production on industrial scale in industrial facilities.

The invention claimed is:

1. An olefin polymerization catalyst comprising the following components [A], [B] and [C]:

the component [A]: a metallocene complex represented by the following general formula (1), the component [B]: a solid component containing one or more selected from the group consisting of the following (b-1) to (b-3):

(b-1) a fine particulate carrier on which an ionic compound or Lewis acid which can convert the component [A] into a cation by reaction with the component [A], is supported, (b-2) solid acid fine particles, and (b-3) an ion-exchange layered compound, and the component [C]: an alkyne compound represented by the following general formula (2):

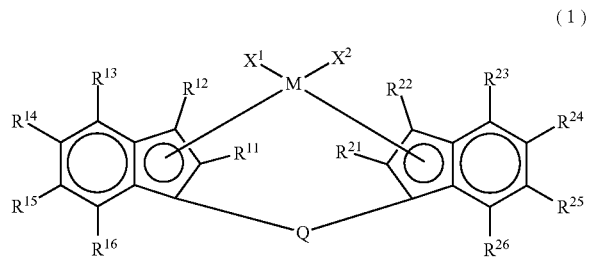

(1)

where M is Ti, Zr or Hf;

each of $X^1$ and $X^2$ is independently a halogen atom, an alkyl group containing 1 to 6 carbon atoms, an alkoxy group containing 1 to 6 carbon atoms, an alkyl group containing 1 to 6 carbon atoms and being substituted with a halogen atom, a substituted amino group substituted with an alkyl group containing 1 to 6 carbon atoms, or an aryl group containing 6 to 18 carbon atoms and optionally being substituted;

Q is an alkylene group containing 1 to 20 carbon atoms and optionally being substituted with an aryl group containing 6 to 18 carbon atoms, a silylene group optionally being substituted with a hydrocarbon group containing 1 to 20 carbon atoms, or a substituted germylene, phosphorus, amino, boron or alumylene group being substituted with a hydrocarbon group containing 1 to 20 carbon atoms; and each of $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ is independently a hydrogen atom, a halogen atom, an alkyl group containing 1 to 6 carbon atoms, an alkoxy group containing 1 to 6 carbon atoms, an alkyl group containing 1 to 6 carbon atoms and being substituted with a halogen atom, an alkyl group containing 1 to 6 carbon atoms and being substituted with a trialkylsilyl group, a substituted silyl group being substituted with a hydrocarbon group containing 1 to 6 carbon atoms, an aryl group containing 6 to 18 carbon atoms and optionally being substituted, a furyl group optionally being substituted, or a thienyl group optionally being substituted, and $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ optionally form a 5- to 7-membered ring with adjacent substituents, the ring optionally including an unsaturated bond,

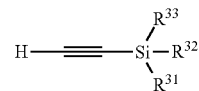

(2)

where each of $R^{31}$, $R^{32}$ and $R^{33}$ is independently a hydrogen atom, a hydrocarbon group containing 1 to 30 carbon atoms, a substituted silyl group being substituted with a hydrocarbon group containing 1 to 20 carbon atoms, a substituted germyl group being substituted with a hydrocarbon group containing 1 to 20 carbon atoms, a hydrocarbon group containing 1 to 30 carbon atoms and being substituted with the substituted silyl group, or a hydrocarbon group containing 1 to 30 carbon atoms and being substituted with the substituted germyl group.

2. The olefin polymerization catalyst according to claim 1, wherein an amount of the contained component [C] is from 0.001 mmol to 100 mmol per gram (g) of the component [B].

3. The olefin polymerization catalyst according to claim 1, wherein the component [B] is an ion-exchange layered silicate.

4. The olefin polymerization catalyst according to claim 1, further comprising the following component [D]:

the component [D]: an organoaluminum compound.

5. An olefin polymerization catalyst production method, wherein an olefin polymerization catalyst is produced by mixing the following components [A], [B] and [C]:

the component [A]: a metallocene complex represented by the following general formula (1), the component [B]: a solid component containing one or more selected from the group consisting of the following (b-1) to (b-3):

(b-1) a fine particulate carrier on which an ionic compound or Lewis acid which can convert the component [A] into a cation by reaction with the component [A], is supported, (b-2) solid acid fine particles, and (b-3) an ion-exchange layered compound, and the component [C]: an alkyne compound represented by the following general formula (2):

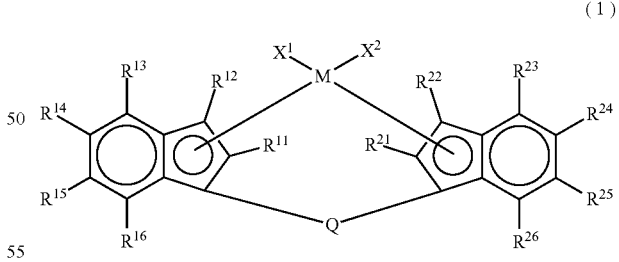

(1)

where M is Ti, Zr or Hf;

each of $X^1$ and $X^2$ is independently a halogen atom, an alkyl group containing 1 to 6 carbon atoms, an alkoxy group containing 1 to 6 carbon atoms, an alkyl group containing 1 to 6 carbon atoms and being substituted with a halogen atom, a substituted amino group substituted with an alkyl group containing 1 to 6 carbon atoms, or an aryl group containing 6 to 18 carbon atoms and optionally being substituted;

Q is an alkylene group containing 1 to 20 carbon atoms and optionally being substituted with an aryl group containing 6 to 18 carbon atoms, a silylene group optionally being substituted with a hydrocarbon group containing 1 to 20 carbon atoms, or a substituted germylene, phosphorus, amino, boron or alumylene group being substituted with a hydrocarbon group containing 1 to 20 carbon atoms; and each of $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ is independently a hydrogen atom, a halogen atom, an alkyl group containing 1 to 6 carbon atoms, an alkoxy group containing 1 to 6 carbon atoms, an alkyl group containing 1 to 6 carbon atoms and being substituted with a halogen atom, an alkyl group containing 1 to 6 carbon atoms and being substituted with a trialkylsilyl group, a substituted silyl group being substituted with a hydrocarbon group containing 1 to 6 carbon atoms, an aryl group containing 6 to 18 carbon atoms and optionally being substituted, a furyl group optionally being substituted, or a thienyl group optionally being substituted, and $R^{11}$, $R^{12}$, $R^{13}$, $R^{14}$, $R^{15}$, $R^{16}$, $R^{21}$, $R^{22}$, $R^{23}$, $R^{24}$, $R^{25}$ and $R^{26}$ optionally form a 5- to 7-membered ring with adjacent substituents, the ring optionally including an unsaturated bond,

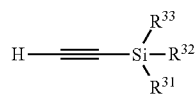

(2)

where each of $R^{31}$, $R^{32}$ and $R^{33}$ is independently a hydrogen atom, a hydrocarbon group containing 1 to 30 carbon atoms, a substituted silyl group being substituted with a hydrocarbon group containing 1 to 20 carbon atoms, a substituted germyl group being substituted with a hydrocarbon group containing 1 to 20 carbon atoms, a hydrocarbon group containing 1 to 30 carbon atoms and being substituted with the substituted silyl group, or a hydrocarbon group containing 1 to 30 carbon atoms and being substituted with the substituted germyl group.

6. The olefin polymerization catalyst production method according to claim 5, wherein the components [B] and [C] are mixed, and then the component [A] is mixed with the mixture.

7. The olefin polymerization catalyst production method according to claim 5, wherein an amount of the component [C] used is from 0.001 mmol to 100 mmol per gram (g) of the component [B].

8. The olefin polymerization catalyst production method according to claim 5, wherein the component [B] is an ion-exchange layered silicate.

9. The olefin polymerization catalyst production method according to claim 5, wherein the following component [D] is further added:

the component [D]: an organoaluminum compound.

10. An olefin polymer production method, wherein an olefin is polymerized or copolymerized in the presence of the olefin polymerization catalyst defined by claim 1.

11. An olefin polymer production method, wherein a propylene is polymerized or a propylene is copolymerized with an ethylene in the presence of the olefin polymerization catalyst defined by claim 1.

* * * * *